US012047949B2

(12) United States Patent
Gong et al.

(10) Patent No.: US 12,047,949 B2
(45) Date of Patent: Jul. 23, 2024

(54) RANDOM ACCESS METHOD AND APPARATUS

(71) Applicant: Huawei Technologies Co., Ltd., Shenzhen (CN)

(72) Inventors: Zhengwei Gong, Shanghai (CN); Yiqun Wu, Shanghai (CN); Yan Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 17/402,363

(22) Filed: Aug. 13, 2021

(65) Prior Publication Data

US 2021/0377987 A1    Dec. 2, 2021

Related U.S. Application Data

(63) Continuation of application No. PCT/CN2020/075231, filed on Feb. 14, 2020.

(30) Foreign Application Priority Data

Feb. 15, 2019   (CN) .......................... 201910118189.7

(51) Int. Cl.
*H04W 72/12* (2023.01)
*H04W 72/1273* (2023.01)
(Continued)

(52) U.S. Cl.
CPC ....... *H04W 72/1273* (2013.01); *H04W 72/23* (2023.01); *H04W 74/0833* (2013.01)

(58) Field of Classification Search
CPC ............. H04W 72/1273; H04W 72/23; H04W 72/044; H04W 72/0833; H04L 5/0053
(Continued)

(56) References Cited

U.S. PATENT DOCUMENTS

2012/0250520 A1* 10/2012 Chen ................. H04W 56/0045
  370/328
2013/0044665 A1*  2/2013 Ng ...................... H04W 52/242
  370/311
(Continued)

FOREIGN PATENT DOCUMENTS

CN           102325382 A      1/2012
CN           108282899 A      7/2018
(Continued)

OTHER PUBLICATIONS

MediaTek Inc., "On 4-step RACH procedure," 3GPP TSG RAN WG1 Meeting #90, Prague, Czechia, R1-1713701, total 6 pages, 3rd Generation Partnership Project, Valbonne, France (Aug. 21-25, 2017).
(Continued)

*Primary Examiner* — Candal Elpenord
(74) *Attorney, Agent, or Firm* — Leydig, Voit & Mayer, Ltd.

(57) ABSTRACT

A random access method and an apparatus are described that provide improved transmission efficiency of a response message based on the response message scheduled by a plurality of PDCCHs. A terminal device receives a first control channel resource set used to monitor a common physical downlink control channel PDCCH and a second control channel resource set used to monitor a specific PDCCH that are sent by a network device. The terminal device sends a first message to the network device, and the terminal device monitors a first search space corresponding to the first control channel resource set and a second search space corresponding to the second control channel resource set to receive at least one of the common PDCCH and the specific PDCCH, to schedule a PDSCH that carries a response message of the first message.

19 Claims, 8 Drawing Sheets

(51) Int. Cl.
*H04W 72/23* (2023.01)
*H04W 74/08* (2024.01)
*H04W 74/0833* (2024.01)

(58) Field of Classification Search
USPC .................................................. 370/329–330
See application file for complete search history.

(56) References Cited

U.S. PATENT DOCUMENTS

| | | | |
|---|---|---|---|
| 2014/0050191 A1* | 2/2014 | Kim | H04L 5/0048 |
| | | | 370/329 |
| 2017/0094688 A1 | 3/2017 | Lee et al. | |
| 2018/0124822 A1 | 5/2018 | Wang et al. | |
| 2018/0205516 A1 | 7/2018 | Jung et al. | |
| 2018/0279186 A1 | 9/2018 | Park et al. | |
| 2019/0132845 A1* | 5/2019 | Babaei | H04L 1/1812 |
| 2019/0246421 A1* | 8/2019 | Zhou | H04L 5/00 |
| 2019/0313437 A1* | 10/2019 | Jung | H04L 5/0042 |
| 2019/0357262 A1* | 11/2019 | Cirik | H04W 76/27 |

FOREIGN PATENT DOCUMENTS

| | | |
|---|---|---|
| CN | 104584661 B | 11/2018 |
| CN | 108809451 A | 11/2018 |
| CN | 105493596 B | 1/2019 |
| CN | 111050412 A | 4/2020 |
| JP | 2022520590 A | 3/2022 |
| WO | 2012150836 A2 | 11/2012 |
| WO | 2018127244 A1 | 7/2018 |
| WO | 2019031942 A1 | 2/2019 |

OTHER PUBLICATIONS

"3rd Generation Partnership Project; Technical Specification Group Radio Access Network; NR; Physical layer procedures for control (Release 15)," 3GPP TS 38.213 V15.4.0, total 104 pages, 3rd Generation Partnership Project, Valbonne, France (Dec. 2018).

"3rd Generation Partnership Project; Technical Specification Group Radio Access Network; NR; Medium Access Control (MAC) protocol specification (Release 15)," 3GPP TS 38.321 V15.4.0, total 77 pages, 3rd Generation Partnership Project, Valbonne, France (Dec. 2018).

Huawei et al., "Discussion on 2-step RACH procedure," 3GPP TSG RAN WG1 Meeting #96, Athens, Greece, R1-1903057, Total 4 pages, 3rd Generation Partnership Project, Valbonne, France (Feb. 25-Mar. 1, 2019).

* cited by examiner

RANDOM ACCESS METHOD AND APPARATUS

CROSS-REFERENCE TO RELATED APPLICATIONS

This application is a continuation of International Application No. PCT/CN2020/075231, filed on Feb. 14, 2020, which claims priority to Chinese Patent Application No. 201910118189.7, filed on Feb. 15, 2019. The disclosures of the aforementioned applications are hereby incorporated by reference in their entireties.

TECHNICAL FIELD

This application relates to the communications field, and more specifically, to a random access method and an apparatus in the communications field.

BACKGROUND

With rapid development of ultra-reliable low-latency communication (URLLC), machine type communication (MTC), and an internet of things (IoT) in the future, there is an increasing quantity of application scenarios for sparse data-required transmission, small packet-required data transmission, and low latency-required. To satisfy such data transmission, a 2-step random access channel (RACH) scheme is proposed.

A main idea of the 2-step RACH scheme is to combine procedures of the $1^{st}$ step and the $3^{rd}$ step in a conventional 4-step RACH scheme into one step, and combine procedures of the $2^{nd}$ step and the $4^{th}$ step in the conventional 4-step RACH scheme into one step. Therefore, the 2-step RACH scheme greatly accelerates a random access process. A 2-step RACH method is provided. First, a terminal device sends a Msg A, and the Msg A includes a random access preamble and a physical uplink shared channel (PUSCH). Then, the terminal device receives a response Msg B that is sent by a network side and that corresponds to the Msg A.

To be specific, in a 4-step RACH procedure, a PDSCH scheduled by a common physical downlink control channel (PDCCH) may be used to carry a response to a preamble, while in a 2-step RACH procedure, a PDSCH scheduled by a common PDCCH may be used to carry the response to the Msg A. However, there is a relatively large quantity of application scenarios in which a 2-step RACH is used, there is a relatively large difference between contents of Msgs A sent by different terminals, and there is a relatively large difference between contents and sizes of response messages that need to be correspondingly sent by the network side. Consequently, transmission efficiency is relatively low when a common PDCCH is used to schedule a common PDSCH to carry a response message.

SUMMARY

This application provides a random access method and an apparatus, to improve transmission efficiency of a response message based on the response message scheduled by a plurality of PDCCHs.

According to a first aspect, a random access method is provided. The method includes: receiving, by a terminal device, a first control channel resource set used to monitor a common physical downlink control channel PDCCH and a second control channel resource set used to monitor a specific PDCCH that are sent by a network device, where the first control channel resource set corresponds to a first search space, and the second control channel resource set corresponds to a second search space; sending, by the terminal device, a first message to the network device, where the first message includes a random access preamble and a physical uplink shared channel PUSCH; and monitoring, by the terminal device, the first search space and the second search space to receive at least one of the common PDCCH and the specific PDCCH that are sent by the network device, where the at least one of the common PDCCH and the specific PDCCH is used to schedule a PDSCH that carries a response message of the first message, the response message includes at least one of a response to the random access preamble and a response to the PUSCH, the response to the random access preamble is carried on a PDSCH scheduled by the common PDCCH, and the response to the PUSCH is carried on a specific PDSCH scheduled by the specific PDCCH.

Therefore, in this embodiment of this application, the terminal device monitors the first search space and the second search space to receive the at least one of the common PDCCH and the specific PDCCH, where the at least one of the common PDCCH and the specific PDCCH is used to schedule the PDSCH that carries the response message of the first message, the first message includes the preamble and the PUSCH, and the response message includes the at least one of the response to the preamble and the response to the PUSCH. In comparison with the prior art in which a PDSCH that carries a Msg B is scheduled by one common PDCCH, in this embodiment of this application, transmission efficiency of the response message can be improved based on the response message scheduled by a plurality of PDCCHs.

In this embodiment of this application, the first control channel resource set and the second control channel resource set may be the same or may be different, and the first search space and the second search space may be the same or may be different. In an optional embodiment of this application, the first search space may correspond to a common search space, and the second search space may correspond to a specific search space. In another optional embodiment of this application, the second search space and the first search space may be the same, and both are common search spaces.

With reference to the first aspect, in some implementations of the first aspect, the monitoring, by the terminal device, the first search space and the second search space to receive at least one of the common PDCCH and the specific PDCCH that are sent by the network device includes: monitoring, by the terminal device, the second search space to receive the specific PDCCH, where the specific PDCCH is used to schedule the PDSCH that carries the response message of the first message, and the response message includes the response to the PUSCH; or monitoring, by the terminal device, the first search space to receive the common PDCCH, where the common PDCCH is used to schedule the PDSCH that carries the response message of the first message, and the response message includes the response to the random access preamble.

Therefore, in this embodiment of this application, the network device can adaptively adjust a transmission manner of the response message (namely, a Msg B) based on a detection status of the first message (namely, a Msg A), so that not only efficient transmission of different Msgs B is supported in a manner in which the specific PDCCH indicates the specific PDSCH, but also response transmission of a part of Msgs A that are correctly detected is supported in a manner in which the common PDCCH indicates a common PDSCH. Therefore, flexible and efficient response transmission of the Msg B can be implemented in this embodiment of this application.

With reference to the first aspect, in some implementations of the first aspect, the monitoring, by the terminal device, the first search space and the second search space to receive at least one of the common PDCCH and the specific PDCCH that are sent by the network device includes: monitoring, by the terminal device, the first search space to receive the common PDCCH, where the common PDCCH is used to schedule the response to the random access preamble; or monitoring, by the terminal device, the second search space based on the response to the random access preamble to receive the specific PDCCH, where the specific PDCCH is used to schedule the PDSCH that carries the response to the PUSCH.

Therefore, in this embodiment of this application, the network device can adaptively adjust a transmission manner of a Msg B based on a detection status of a Msg A, so that not only efficient transmission of different Msgs B is supported in a manner in which the specific PDCCH indicates the specific PDSCH, but also response transmission of a part of Msgs A that are correctly detected is supported in a manner in which the common PDCCH indicates a common PDSCH. Therefore, flexible and efficient response transmission of the Msg B can be implemented in this embodiment of this application.

Optionally, in this embodiment of this application, if the terminal device does not accurately detect, based on the common PDCCH and the common PDSCH, the response corresponding to the preamble in the sent Msg A, the terminal device does not need to monitor the specific PDCCH. Therefore, in this embodiment of this application, complexity and power consumption of the terminal can be further reduced.

With reference to the first aspect, in some implementations of the first aspect, the monitoring, by the terminal device, the second search space to receive the specific PDCCH includes: monitoring, by the terminal device, the second search space based on a specific radio network temporary identifier (S-RNTI) to receive the specific PDCCH, where the S-RNTI is determined based on a resource unit used when the first message is sent, or the S-RNTI is a cell radio network temporary identifier (C-RNTI), or the S-RNTI is determined based on a contention resolution identifier in the first message, where the resource unit used when the first message is sent includes at least one of an index of the random access preamble, a time-frequency resource block of the PUSCH, and an antenna port corresponding to the PUSCH.

Therefore, resource units used by different first messages of a plurality of terminal devices are different, so that the plurality of terminal devices may correspond to different S-RNTIs. In this way, the network device can separately carry, in specific PUSCHs that are scheduled by the specific PDCCH and that correspond to the terminal devices, responses of the terminal devices to the PUSCHs.

With reference to the first aspect, in some implementations of the first aspect, the monitoring, by the terminal, the second search space based on the response to the random access preamble to receive the specific PDCCH includes: monitoring, by the terminal device, the second search space based on a temporary cell radio network temporary identifier (TC-RNTI) carried in the response to the random access preamble to receive the specific PDCCH.

Therefore, in this embodiment of this application, the terminal device may first detect the common PDCCH, and then determine, based on a detection status of the common PDCCH, whether to detect the specific PDCCH. In other words, if the terminal device successfully detects the common PDCCH, the terminal device obtains the TC-RNTI from the common PDSCH scheduled by the common PDCCH, and then may continue to monitor the specific PDCCH based on the TC-RNTI. If the terminal device fails to detect the common PDCCH, the terminal device cannot obtain the TC-RNTI. Consequently, the terminal device may no longer continue to monitor the specific PDCCH.

With reference to the first aspect, in some implementations of the first aspect, the monitoring, by the terminal device, the first search space to receive the common PDCCH includes: monitoring, by the terminal device, the first search space based on a group radio network temporary identifier (G-RNTI) to receive the common PDCCH, where the G-RNTI is determined based on a resource block in which the resource unit used when the first message is sent is located, and the resource block includes a time-frequency resource block used to send the random access preamble.

Therefore, resource units used by different first messages of a plurality of terminal devices may be the same, so that the plurality of terminal devices may correspond to a same G-RNTI. In this way, the network device can simultaneously carry, in PUSCHs scheduled by the common PDCCH, responses of the plurality of terminal devices to random access preambles.

With reference to the first aspect, in some implementations of the first aspect, the method further includes: obtaining, by the terminal device, first configuration information, where the first configuration information includes a window length of a first time window and a window length of a second time window, the window length of the first time window is a length of a time window used to receive the response message of the first message, the window length of the second time window is a length of a time window used to receive a response message of a second message, and the second message includes only the random access preamble.

Therefore, for a terminal device that supports both a 4-step RACH and a 2-step RACH, the network device may flexibly indicate a start position of the time window for receiving the response message, to satisfy a processing latency of response receiving by the terminal device and a capacity requirement of channel control by the terminal device in two different scenarios: the 4-step RACH and the 2-step RACH.

With reference to the first aspect, in some implementations of the first aspect, the first time window starts after a time-domain symbol occupied by the PUSCH. Therefore, for a 2-step RACH procedure, the terminal device may enter a receiving phase of a Msg B after sending the PUSCH.

With reference to the first aspect, in some implementations of the first aspect, the time-domain symbol occupied by the PUSCH may include a blank symbol, and the blank symbol is a part of the PUSCH and is not used to send any signal. Specifically, the blank symbol may be used as a guard time. Therefore, in this embodiment of this application, the network device determines, based on the guard time for PUSCH transmission, the start position of the time window for receiving the response message, so that power consumption of the terminal device can be further reduced.

With reference to the first aspect, in some implementations of the first aspect, the method further includes: obtaining, by the terminal device, second configuration information, where the second configuration information includes a window length of a third time window and a window length of a fourth time window, where the window length of the third time window is a length of a time window used to receive the RAR, and the window length of the fourth time window is a length of a time window used to receive the response to the PUSCH.

Therefore, for a case in which a Msg B includes a first part of a response to a preamble in a Msg A sent by one common PDCCH and a common PDSCH corresponding to the common PDCCH, and a second part of a response to a PUSCH in a Msg A sent by one specific PDCCH and a specific PDSCH corresponding to the specific PDCCH, the network device may flexibly indicate, separately for contents of the two parts of the responses, the start position of the time window for receiving response information corresponding to the contents of the two parts of the responses, to satisfy a processing latency of response receiving by the terminal device and a capacity requirement of channel control by the terminal device.

With reference to the first aspect, in some implementations of the first aspect, the third time window starts from a time-domain symbol after a time domain symbol of the random access preamble. In this way, after sending the preamble, the terminal device may enter a receiving phase of the response to the preamble, and monitor the common PDCCH in the first search space.

With reference to the first aspect, in some implementations of the first aspect, the fourth time window starts after a common PDSCH received by the terminal device, and the common PDSCH is scheduled by the common PDCCH. In this way, after detecting the common PDCCH and receiving the common PDSCH scheduled by the common PDCCH, the terminal device may enter a receiving phase of the response to the PUSCH, and monitor the specific PDCCH in the second search space.

Optionally, in this embodiment of this application, the network device may further determine, based on the processing latency of the PUSCH and/or the common PDSCH, the start position of the time window for receiving the response message. In this way, power consumption of the terminal device can be further reduced.

With reference to the first aspect, in some implementations of the first aspect, the second search space is determined based on the S-RNTI by scrambling the specific PDCCH. Therefore, in this embodiment of this application, when the terminal device that monitors the second search space does not obtain the TC-RNTI, the terminal device may determine a start position of the second search space based on the S-RNTI.

According to a second aspect, a random access method is provided. The method includes: sending, by a network device to a terminal device, a first control channel resource set used to monitor a common physical downlink control channel PDCCH and a second control channel resource set used to monitor a specific PDCCH, where the first control channel resource set corresponds to a first search space, and the second control channel resource set corresponds to a second search space; receiving, by the network device, a first message sent by the terminal device, where the first message includes a random access preamble and a physical uplink shared channel PUSCH; and sending, by the network device, at least one of the common PDCCH and the specific PDCCH to the terminal device, where the at least one of the common PDCCH and the specific PDCCH is used to schedule a PDSCH that carries a response message of the first message, the response message includes at least one of a response to the random access preamble and a response to the PUSCH, the response to the random access preamble is carried on a PDSCH scheduled by the common PDCCH, and the response to the PUSCH is carried on a specific PDSCH scheduled by the specific PDCCH.

Therefore, in this embodiment of this application, the terminal device monitors the first search space and the second search space to receive the at least one of the common PDCCH and the specific PDCCH, where the at least one of the common PDCCH and the specific PDCCH is used to schedule the PDSCH that carries the response message of the first message, the first message includes the preamble and the PUSCH, and the response message includes the at least one of the response to the preamble and the response to the PUSCH. In comparison with the prior art in which a PDSCH that carries a Msg B is scheduled by one common PDCCH, in this embodiment of this application, transmission efficiency of the response message can be improved based on the response message scheduled by a plurality of PDCCHs.

In this embodiment of this application, the first control channel resource set and the second control channel resource set may be the same or may be different, and the first search space and the second search space may be the same or may be different. In an optional embodiment of this application, the first search space may correspond to a common search space, and the second search space may correspond to a specific search space. In another optional embodiment of this application, the second search space and the first search space may be the same, and both are common search spaces.

With reference to the second aspect, in some implementations of the second aspect, the sending, by the network device, at least one of the common PDCCH and the specific PDCCH to the terminal device includes: sending, by the network device, the specific PDCCH to the terminal device, where the specific PDCCH is used to schedule the PDSCH that carries the response message of the first message, and the response message includes the response to the PUSCH; or sending, by the network device, the common PDCCH to the terminal device, where the common PDCCH is used to schedule the PDSCH that carries the response message of the first message, and the response message includes the response to the random access preamble.

Therefore, in this embodiment of this application, the network device can adaptively adjust a transmission manner of the response message (namely, a Msg B) based on a detection status of the first message (namely, a Msg A), so that not only efficient transmission of different Msgs B is supported in a manner in which the specific PDCCH indicates the specific PDSCH, but also response transmission of a part of Msgs A that are correctly detected is supported in a manner in which the common PDCCH indicates a common PDSCH. Therefore, flexible and efficient response transmission of the Msg B can be implemented in this embodiment of this application.

With reference to the second aspect, in some implementations of the second aspect, the sending, by the network device, at least one of the common PDCCH and the specific PDCCH to the terminal device includes: sending, by the network device, the common PDCCH to the terminal device, where the common PDCCH is used to schedule the response to the random access preamble; or sending, by the network device, the specific PDCCH to the terminal device based on the response to the random access preamble, where the specific PDCCH is used to schedule the PDSCH that carries the response to the PUSCH.

Therefore, in this embodiment of this application, the network device can adaptively adjust a transmission manner of a Msg B based on a detection status of a Msg A, so that not only efficient transmission of different Msgs B is supported in a manner in which the specific PDCCH indicates the specific PDSCH, but also response transmission of a part of Msgs A that are correctly detected is supported in a manner in which the common PDCCH indicates a common PDSCH. Therefore, flexible and efficient response transmission of the Msg B can be implemented in this embodiment of this application.

Optionally, in this embodiment of this application, if the terminal device does not accurately detect, based on the common PDCCH and the common PDSCH, the response corresponding to the preamble in the sent Msg A, the terminal device does not need to monitor the specific PDCCH. Therefore, in this embodiment of this application, complexity and power consumption of the terminal can be further reduced.

With reference to the second aspect, in some implementations of the second aspect, the specific PDCCH is scrambled based on a specific radio network temporary identifier S-RNTI, and the S-RNTI is determined based on a resource unit used when the first message is sent, or the S-RNTI is a cell radio network temporary identifier C-RNTI, or the S-RNTI is determined based on a contention resolution identifier in the first message, where the resource unit used when the first message is sent includes at least one of an index of the random access preamble, a time-frequency resource block of the PUSCH, and an antenna port corresponding to the PUSCH.

Therefore, resource units used by different first messages of a plurality of terminal devices are different, so that the plurality of terminal devices may correspond to different S-RNTIs. In this way, the network device can separately carry, in specific PUSCHs that are scheduled by the specific PDCCH and that correspond to the terminal devices, responses of the terminal devices to the PUSCHs.

With reference to the second aspect, in some implementations of the second aspect, the specific PDCCH is scrambled based on a temporary cell radio network temporary identifier TC-RNTI included in the response to the random access preamble, and the TC-RNTI is sent through the PDSCH that carries the response to the random access preamble and that is scheduled by the common PDCCH.

With reference to the second aspect, in some implementations of the second aspect, the common PDCCH is scrambled based on a group radio network temporary identifier G-RNTI, the G-RNTI is determined based on a resource block in which the resource unit used when the first message is received is located, and the resource block includes a time-frequency resource block used to send the random access preamble.

Therefore, resource units used by different first messages of a plurality of terminal devices may be the same, so that the plurality of terminal devices may correspond to a same G-RNTI. In this way, the network device can simultaneously carry, in PUSCHs scheduled by the common PDCCH, responses of the plurality of terminal devices to random access preambles.

With reference to the first aspect, in some implementations of the first aspect, the method further includes: sending, by the network device, first configuration information to the terminal device, where the first configuration information includes a window length of a first time window and a window length of a second time window, the window length of the first time window is a length of a time window used to receive the response message of the first message, the window length of the second time window is a length of a time window used to receive a response message of a second message, and the second message includes only the random access preamble.

Therefore, for a terminal device that supports both a 4-step RACH and a 2-step RACH, the network device may flexibly indicate a start position of the time window for receiving the response message, to satisfy a processing latency of response receiving by the terminal device and a capacity requirement of channel control by the terminal device in two different scenarios: the 4-step RACH and the 2-step RACH.

With reference to the second aspect, in some implementations of the second aspect, the first time window starts after a time-domain symbol occupied by the PUSCH, and the second time window starts from a time-domain symbol of the random access preamble preamble.

Therefore, for a 2-step RACH procedure, the terminal device may enter a receiving phase of a Msg B after sending the PUSCH.

With reference to the second aspect, in some implementations of the second aspect, the time-domain symbol occupied by the PUSCH may include a blank symbol, and the blank symbol is a part of the PUSCH and is not used to send any signal. Specifically, the blank symbol may be used as a guard time. Therefore, in this embodiment of this application, the network device determines, based on the guard time for PUSCH transmission, the start position of the time window for receiving the response message, so that power consumption of the terminal device can be further reduced.

With reference to the first aspect, in some implementations of the first aspect, the method further includes: sending, by the network device, second configuration information to the terminal device, where the second configuration information includes a window length of a third time window and a window length of a fourth time window, the window length of the third time window is a length of a time window used to receive the response to the random access preamble, and the window length of the fourth time window is a length of a time window used to receive the response to the PUSCH.

Therefore, for a case in which a Msg B includes a first part of a response to a preamble in a Msg A sent by one common PDCCH and a common PDSCH corresponding to the common PDCCH, and a second part of a response to a PUSCH in a Msg A sent by one specific PDCCH and a specific PDSCH corresponding to the specific PDCCH, the network device may flexibly indicate, separately for contents of the two parts of the responses, the start position of the time window for receiving response information corresponding to the contents of the two parts of the responses, to satisfy a processing latency of response receiving by the terminal device and a capacity requirement of channel control by the terminal device.

With reference to the first aspect, in some implementations of the first aspect, the third time window starts from a time-domain symbol after a time domain symbol of the random access preamble preamble. In this way, after sending the preamble, the terminal device may enter a receiving phase of the response to the preamble, and monitor the common PDCCH in the first search space.

With reference to the second aspect, in some implementations of the second aspect, the fourth time window starts after a common PDSCH received by the terminal device, and the common PDSCH is scheduled by the common PDCCH. In this way, after detecting the common PDCCH and receiving the common PDSCH scheduled by the common PDCCH, the terminal device may enter a receiving phase of the response to the PUSCH, and monitor the specific PDCCH in the second search space.

Optionally, in this embodiment of this application, the network device may further determine, based on the processing latency of the PUSCH and/or the common PDSCH, the start position of the time window for receiving the response message. In this way, power consumption of the terminal device can be further reduced.

With reference to the second aspect, in some implementations of the second aspect, the second search space is determined based on the S-RNTI by scrambling the specific PDCCH. Therefore, in this embodiment of this application, when the terminal device that monitors the second search space does not obtain the TC-RNTI, the terminal device may determine a start position of the second search space based on the S-RNTI.

According to a third aspect, a communications apparatus is provided. The apparatus may be a terminal device, or may be a chip in a terminal device. The apparatus has a function of implementing various possible implementations of the first aspect. The function may be implemented by hardware, or may be implemented by hardware executing corresponding software. The hardware or the software includes one or more modules corresponding to the foregoing function.

In a possible design, the apparatus includes a transceiver module. Optionally, the apparatus further includes a processing module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the apparatus includes the storage module, the storage module is configured to store an instruction. The processing module is connected to the storage module, and the processing module may execute the instruction stored in the storage module or instructions from others, so that the apparatus performs the method according to the first aspect and the various possible implementations.

In another possible design, when the apparatus is the chip, the chip includes a transceiver module. Optionally, the chip further includes a processing module. The transceiver module may be, for example, an input/output interface, a pin, or a circuit on the chip. The processing module may be, for example, a processor. The processing module may execute an instruction, so that the chip in the terminal performs the communication method according to any one of the first aspect or the possible implementations of the first aspect. Optionally, the processing module may execute the instruction in a storage module, and the storage module may be a storage module, for example, a register or a cache, in the chip. The storage module may alternatively be located inside a communications device, but outside the chip, such as a read-only memory (ROM), another type of static storage device that can store static information and an instruction, and a random access memory (RAM).

The processor mentioned anywhere above may be a general-purpose central processing unit (CPU), a microprocessor, an application-specific integrated circuit (ASIC), or one or more integrated circuits configured to control program execution of the method according to the first aspect and the various possible implementations.

According to a fourth aspect, a communications apparatus is provided. The apparatus may be a network device, or may be a chip in a network device. The apparatus has a function of implementing various possible implementations of the second aspect. The function may be implemented by hardware, or may be implemented by hardware executing corresponding software. The hardware or the software includes one or more modules corresponding to the foregoing function.

In a possible design, the apparatus includes a transceiver module. Optionally, the apparatus further includes a processing module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the apparatus includes the storage module, the storage module is configured to store an instruction. The processing module is connected to the storage module, and the processing module may execute the instruction stored in the storage module or instructions from others, so that the apparatus performs the communication method according to the second aspect and the various possible implementations.

In another possible design, when the apparatus is the chip, the chip includes a transceiver module. Optionally, the apparatus further includes a processing module. The transceiver module may be, for example, an input/output interface, a pin, or a circuit on the chip. The processing module may be, for example, a processor. The processing module may execute an instruction, so that the chip in the terminal performs the method according to any one of the first aspect or the possible implementations of the first aspect. Optionally, the processing module may execute the instruction in a storage module, and the storage module may be a storage module, for example, a register or a cache, in the chip. The storage module may alternatively be located inside a communications device, but outside the chip, such as a read-only memory (ROM), another type of static storage device that can store static information and an instruction, and a random access memory (RAM).

The processor mentioned anywhere above may be a general-purpose central processing unit (CPU), a microprocessor, an application-specific integrated circuit (ASIC), or one or more integrated circuits configured to control program execution according to the second aspect and the various possible implementations.

According to a fifth aspect, a computer storage medium is provided. The computer storage medium stores program code. The program code is used to indicate an instruction for performing the method according to any one of the first aspect, the second aspect, or the possible implementations of the first aspect or the second aspect.

According to a sixth aspect, a computer program product including an instruction is provided. When the computer program product runs on a computer, the computer is enabled to perform the method according to any one of the first aspect, the second aspect, or the possible implementations of the first aspect or the second aspect.

According to a seventh aspect, a communications system is provided. The communications system includes an apparatus that has a function of implementing the method and the possible designs according to the first aspect and an apparatus that has a function of implementing the method and the possible designs according to the second aspect.

According to an eighth aspect, a processor is provided. The processor is coupled to a memory, and is configured to perform the method according to any one of the first aspect, the second aspect, or the possible implementations of the first aspect or the second aspect.

According to a ninth aspect, a chip is provided. The chip includes a processor and a communications interface. The communications interface is configured to communicate with an external component or an internal component, and the processor is configured to implement the method according to any one of the first aspect, the second aspect, or the possible implementations of the first aspect or the second aspect.

Optionally, the chip may alternatively include a memory. The memory stores an instruction, and the processor is configured to execute the instruction stored in the memory or instructions from others. When the instruction is executed, the processor is configured to implement the method according to any one of the first aspect, the second aspect, or the possible implementations of the first aspect or the second aspect.

Optionally, the chip may be integrated into a terminal device or a network device.

DESCRIPTION OF EMBODIMENTS

Figure 1:
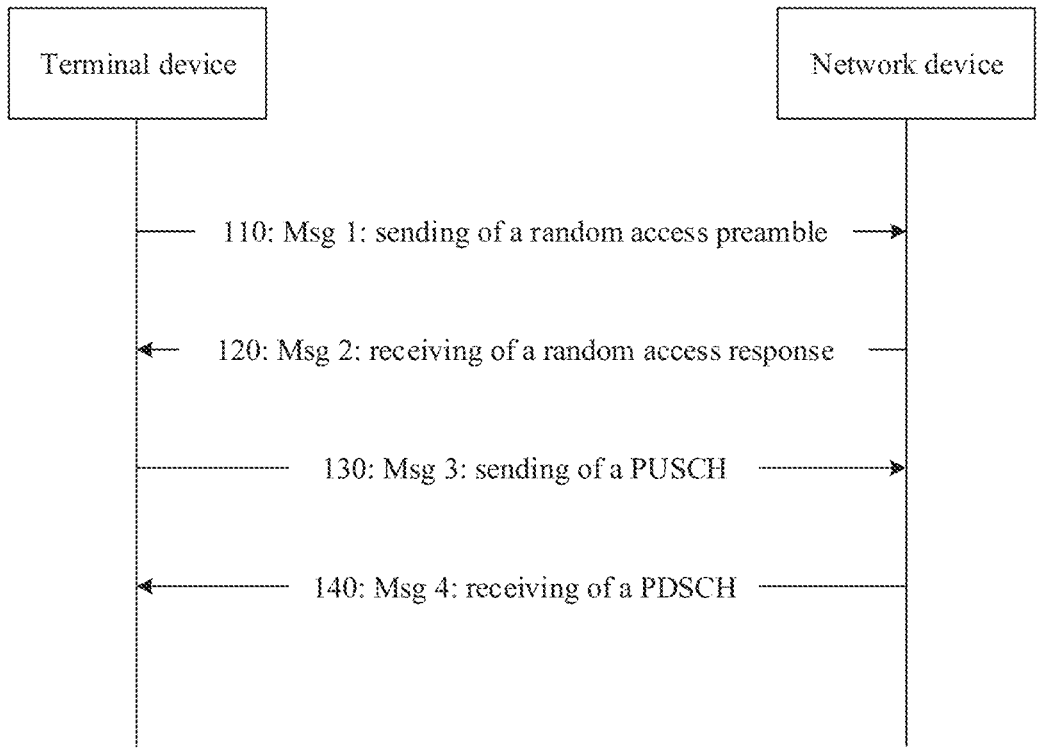
FIG. 1 is a schematic flowchart of a 4-step RACH.

The following describes technical solutions of this application with reference to the accompanying drawings.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, and a new radio (NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device (e.g., a base station) in a 5G network, a network device in a future evolved PLMN network, or the like. This is not limited in the embodiments of this application.

In a conventional mobile broadband (MBB) service scenario, a wireless transmission service does not have a high requirement for a transmission latency, an MBB service packet transmitted each time is relatively large, and an overhead proportion corresponding to a control channel transmitted along with a data channel is relatively low. Therefore, when a terminal in a conventional idle (IDLE)/inactive (INACTIVE) state intends to initiate random access, a 4-step random access channel (RACH) procedure is usually used to complete a random access process.

FIG. 1 is a schematic flowchart of a 4-step RACH. The 4-step RACH scheme includes steps 110 to 140.

110: A terminal device sends a message 1 (Msg 1), where the Msg 1 includes a random access preamble preamble.

120: The terminal device receives a Msg 2 sent by a network device, where a response that is included in the Msg 2 and that corresponds to the preamble is usually referred to as a random access response (RACH response, RAR), and the RAR is carried by a PDSCH scheduled by a PDCCH that is scrambled by using a random access radio network temporary identifier (RA-RNTI).

130: The terminal device sends a PUSCH, namely, a Msg 3, based on an uplink grant (UL grant) of the RAR, to carry information, for example, user identifier information and RRC connection request information, that is used for a contention resolution.

Optionally, to support early data transmission (EDT), the terminal device may carry user-side data information in the PUSCH of the Msg 3.

140: The terminal device receives a PDSCH, namely, a Msg 4, sent by the network device, where the PDSCH is scheduled by a PDCCH that is scrambled by using a TC-RNTI, the PDSCH includes feedback information for the Msg 3, and the feedback information includes information, for example, the user identifier information and RRC connection setup information, that is sent by the terminal device.

Figure 2:
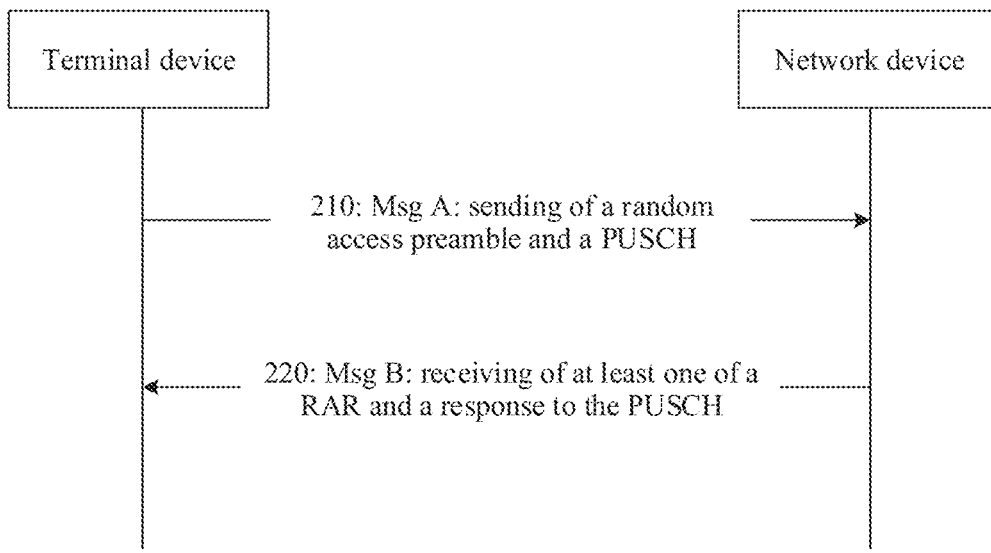
FIG. 2 is a schematic flowchart of a 2-step RACH according to an embodiment of this application.

It can be learned from FIG. 1 that four steps such as the Msg 1, the Msg 2, the Msg 3, and the Msg 4 need to be implemented to complete a 4-step RACH procedure. In consideration with a waiting interval for data processing, it takes a latency of dozens of milliseconds to complete the 4-step RACH procedure. This cannot satisfy a requirement of an emerging low-latency service. Therefore, a 2-step RACH scheme is introduced. FIG. 2 is a schematic flowchart of a 2-step RACH according to an embodiment of this application. The 2-step RACH scheme includes steps 210 and 220.

210: A terminal device sends a message A (Msg A), where the Msg A includes a random access preamble preamble and a PUSCH, and the step 210 is equivalent to sending the Msg 1 and the Msg 3 in the 4-step RACH.

220: The terminal device receives a response message B (Msg B) sent by a network device in response to the Msg A.

In this embodiment of this application, the Msg B includes at least one of a response to the preamble and a response to the PUSCH, and the response to the random access preamble in the Msg B may also be referred to as a random access response RAR. Herein, the RAR may include at least one of a timing advance (timing advancement, TA), a temporary cell radio network temporary identifier (temporary C-RNTI, TC-RNTI), an uplink grant (UL grant), and a preamble index. The response to the PUSCH is, for example, a contention resolution message (CRM), and mainly includes at least one of identification information, RRC connection (re-)setup (connection (re-)setup) information, or the like of the terminal device.

The 2-step RACH scheme can be used in a plurality of scenarios, such as an IDLE state, an INACTIVE state, and an active (ACTIVE) state. The scenarios are described as follows:

IDLE state: There is no RRC connection, and the terminal device does not have any context information on a network device side. Such a terminal device may initiate random access for a purpose of synchronization, a connection setup request, data sending, or the like.

INACTIVE state: There is no RRC connection, and the terminal device has context information on a network side. Such a terminal device may initiate random access for a purpose of synchronization, state switching, data sending, or the like.

ACTIVE state: There is an RRC connection and a cell radio network temporary identifier (C-RNTI). Such a terminal may initiate random access for a purpose of synchronization, beam scanning, cell handover, data sending, or the like.

In conclusion, there is a relatively large quantity of application scenarios in which the RACH is used. In this way, in the 2-step RACH procedure, there is a relatively large difference between contents of Msgs A sent by different terminal devices, and there is a relatively large difference between contents and sizes of response messages Msgs B that need to be sent by the network device. In view of this, the embodiments of this application provide a random access method. The terminal device monitors a first search space and a second search space to receive at least one of a common PDCCH and a specific PDCCH, and then obtains the Msg B based on the at least one of the common PDCCH and the specific PDCCH. The at least one of the common PDCCH and the specific PDCCH is used to schedule a PDSCH that carries the Msg B.

In the prior art, the common PDCCH is used to schedule a common PDSCH to carry the response message Msg B, and the response message Msg B reuses a structure that is broadcast by a conventional RAR. This causes relatively low transmission efficiency. In comparison with the prior art in which a PDSCH that carries a Msg B is scheduled by one common PDCCH, in the embodiments of this application, the response message Msg B can be scheduled based on a plurality of PDCCHs. The Msg B includes at least one of the response RAR to the preamble and the response to the PUSCH. In the embodiments of this application, when there is a relatively large difference between contents and sizes of response messages Msgs B, transmission efficiency of the response message Msg B can be improved.

The following describes the embodiments of this application in detail with reference to the accompanying drawings. It should be understood that in the embodiments shown below, "first", "second", "third", and various numbers are merely distinguished for convenient description, and are not intended to limit the scope of the embodiments of this application. For example, different messages, different search spaces, different configuration information, or different time windows are distinguished.

It should be further understood that in the embodiments shown below, "pre-obtaining" may include indication by network device signaling or predefinition, for example, definition in a protocol. The "predefinition" may be implemented by pre-storing corresponding code or a table in a device (e.g., including a terminal device and a network device) or in another manner that can be used to indicate related information. A specific implementation of the "predefinition" is not limited in this application.

It should be further understood that "storing" in the embodiments of this application may refer to storing in one or more memories. The one or more memories may be separately disposed, or may be integrated into an encoder or a decoder, a processor, or a communications apparatus. Alternatively, a part of the one or more memories may be separately disposed, and a part of the one or more memories may be integrated into a decoder, a processor, or a communications apparatus. The memory may be a storage medium in any form. This is not limited in this application.

It should be further understood that in the embodiments of this application, the "protocol" may be a standard protocol in the communications field, for example, may include an LTE protocol, an NR protocol, and a related protocol used in a future communications system. This is not limited in this application.

The technical solutions of this application may be applied to a wireless communications system, and there may be a wireless communication connection relationship between two communications apparatuses in the wireless communications system. One of the two communications apparatuses may be, for example, a network device or a chip configured in the network device, and the other of the two communications apparatuses may be, for example, a terminal device or a chip configured in the terminal device.

Without loss of generality, the following first describes the embodiments of this application in detail by using a transmission process between one terminal device and one network device as an example. It may be understood that any terminal device in the wireless communications system or the chip configured in the terminal device may perform random access based on a same method. This is not limited in this application.

Figure 3:
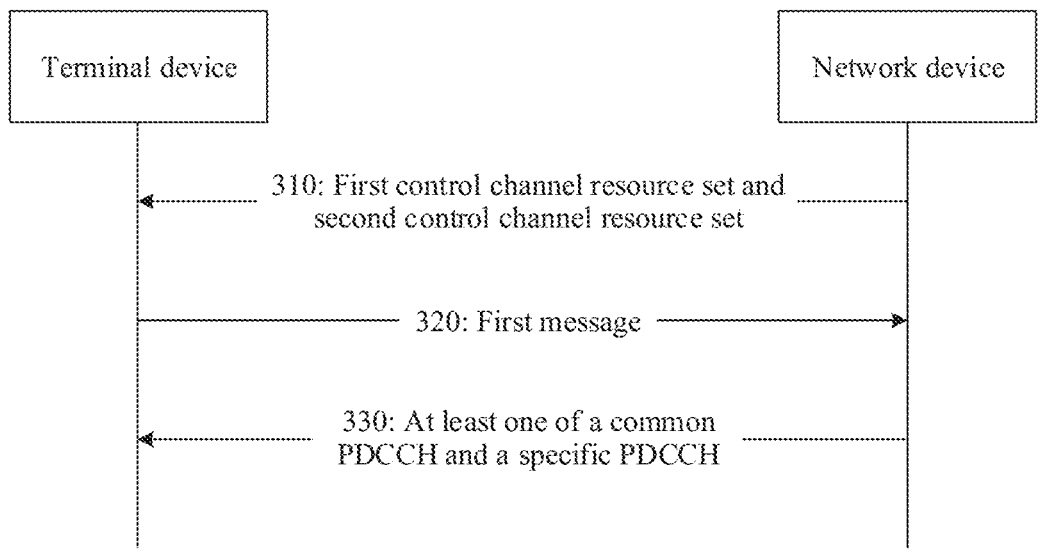
FIG. 3 is a schematic flowchart of a random access method according to an embodiment of this application.

FIG. 3 is a schematic flowchart, illustrated from a perspective of device interaction, of a random access method.

As shown in FIG. 3, the method 300 may include steps 310 to 330. The following describes the steps in the method 300 in detail with reference to FIG. 3.

310: A terminal device receives a first control channel resource set (CORESET) used to monitor a common physical downlink control channel PDCCH and a second control channel resource set used to monitor a specific PDCCH that are sent by a network device, where the first control channel resource set and the second control channel resource set may be the same or may be different, the first control channel resource set corresponds to a first search space, the second control channel resource set corresponds to a second search space, and the first search space and the second search space may be the same or may be different.

A search space includes a group of aggregation levels (aggregation level) and a group of aggregation candidate numbers (candidate number). Sending of one control information occupies only one aggregation candidate resource corresponding to one specific aggregation level. Different aggregation levels are mainly used to implement bit rate adaptation for sending of the control information. An aggregation candidate number mainly specifies one search area for the terminal device. In this way, a network side device can select a specific candidate resource in the search area for sending, to freely coordinate the control information to some extent, and reduce contention between resources for sending of different control information.

In an existing LTE or NR communications system, the terminal device monitors (monitor) a downlink control channel (e.g., a PDCCH). To comprehensively consider flexibility of resource allocation on a control channel transmit side and complexity of blindly monitoring the PDCCH by the terminal device, two types of search spaces may be used for implementation, and the two types of search spaces are a common search space and a specific search space. The common search space is usually configured for a group of terminal devices to receive a common PDCCH. Because a quantity of PDCCHs sent in this type of search space is relatively small, search starting points (starting point) corresponding to different terminal devices that monitor the search space are the same.

The specific search space, namely, a terminal device-specific search space or a UE-specific search space, is usually configured for a specific terminal device to monitor and receive a specific PDCCH of the terminal device. Because there is a relatively large quantity of this type of search spaces in the system, starting points (starting point) of the search spaces of different terminal devices may be different.

Usually, the common PDCCH is monitored and received only from the common search space, while the specific PDCCH may be monitored and received from the common search space or the specific search space. If the specific search space is not configured, the specific PDCCH is monitored and received from the common search space. One search space corresponds to one control channel resource set, and control channel resource sets corresponding to different search spaces may be the same or may be different. In an example, a search space and a control channel resource set that correspond to one PDCCH may be provided in the following Table 1.

TABLE 1

| PDCCH | Search space | | Control channel resource set | |
|---|---|---|---|---|
| Common PDCCH | A first search space is a common search space | The first search space and the second search space are same common search spaces | First control channel resource set | The first control channel resource set and the second control channel set are a same control channel set |
| Specific PDCCH | A second search space is a specific search space | | Second control channel resource set | |

In an optional embodiment of this application, the first search space may correspond to the common search space, and the second search space may correspond to the specific search space. In another optional embodiment of this application, the second search space and the first search space may be the same, and both are common search spaces.

In this embodiment of this application, different configurations may be performed on the first search space corresponding to the common PDCCH and the second search space corresponding to the specific PDCCH. Specifically, the first search space may be determined by at least one of the first control channel resource set (first CORESET), a first aggregation level (AL), and a second aggregation candidate number (CN), and the second search space may be determined by at least one of the second control channel resource set (second CORESET), a second aggregation level, and the second aggregation candidate number. In an example, examples of the first search space and the second search space are listed in Table 2 below. $AL_i$ corresponds to an aggregation candidate number $CN_i$.

TABLE 2

| | Search space |
|---|---|
| First search space | First aggregation levels $\{AL_1, AL_2\}$ and corresponding aggregation candidate numbers $\{CN_1, CN_2\}$ |
| Second search space | Second aggregation levels $\{AL_3, AL_4, AL_5, AL_6\}$ and corresponding aggregation candidate numbers $\{CN_3, CN_4, CN_5, CN_6\}$ |

Specifically, the common PDCCH is usually sent to a group of terminal devices, and there is a relatively large difference between link quality for receiving a downlink control channel in the group of terminal devices. Therefore, an aggregation level used by the network device to send the common PDCCH is usually determined by an aggregation level corresponding to a downlink control channel with worst link quality in the group of terminal devices. Therefore, an aggregation level for sending the common PDCCH is usually relatively high. A difference lies in that an aggregation level used by the network device to send the specific PDCCH may be determined based on link quality of different terminal devices, so that aggregation levels used by the network device to send different specific PDCCHs may be different. For example, the network device may determine link quality of the terminal device based on detection of preambles or PUSCHs in Msgs A sent by different terminal devices. In this way, the aggregation level transmitted by the specific PDCCH of the terminal device is determined. Therefore, different configurations may be performed for search spaces corresponding to a common PDCCH and a specific PDCCH in a 2-step RACH random procedure, to further reduce resource contention between control channels sent in the search spaces corresponding to the common PDCCH and the specific PDCCH, thereby obtaining a higher resource utilization rate.

In an example, both information about the first control channel resource set and information about the second control channel resource set may be sent by using broadcast signaling. Information about the first aggregation level, the first aggregation candidate number, the second aggregation level, and the second aggregation candidate number may be sent by using the broadcast signaling or predefined by a protocol.

320: The terminal device sends a first message to the network device, where the first message includes a random access preamble preamble and a physical uplink shared channel PUSCH. Herein, the first message is, for example, the Msg A described above. For convenience, an example in which the first message is the Msg A is used for description in the following embodiments. However, the embodiments of this application are not limited thereto.

330: The terminal device receives at least one of the common PDCCH and the specific PDCCH that are sent by the network device.

After sending the Msg A in the 2-step RACH procedure, the terminal device enters a receiving phase of a response message. Herein, the response message is a feedback that is for the Msg A and that is sent by the network device to the terminal device. Herein, the response message is, for example, the Msg B described above. For convenience, an example in which the response message is the Msg B is used for description in the following embodiments. However, the embodiments of this application are not limited thereto.

The Msg B includes at least one of a random access response (RACH response, RAR) to the random access preamble preamble and a response to the PUSCH.

Specifically, the terminal device monitors the first search space and the second search space to receive the at least one of the common PDCCH and the specific PDCCH that are sent by the network device. The at least one of the common PDCCH and the specific PDCCH is used to schedule a PDSCH that carries the Msg B. The RAR is carried on a PDSCH scheduled by the common PDCCH, and the response to the PUSCH is carried on a specific PDSCH scheduled by the specific PDCCH.

Therefore, in this embodiment of this application, the terminal device monitors the first search space and the second search space to receive the at least one of the common PDCCH and the specific PDCCH, where the at least one of the common PDCCH and the specific PDCCH is used to schedule the PDSCH that carries the response message of the first message, the first message includes the preamble and the PUSCH, and the response message includes the at least one of the response RAR to the preamble and the response to the PUSCH. In comparison with the prior art in which a PDSCH that carries a Msg B is scheduled by one common PDCCH, in this embodiment of this application, transmission efficiency of the response message can be improved based on the response message scheduled by a plurality of PDCCHs.

In this embodiment of this application, that the terminal device monitors the first search space and the second search space to receive the at least one of the common PDCCH and the specific PDCCH that are sent by the network device may be specifically implemented in the following manner 1 or manner 2.

Manner 1

The terminal device may monitor the second search space to receive the specific PDCCH, where the specific PDCCH is used to schedule the PDSCH that carries the response message Msg B of the first message Msg A, and the response message Msg B includes the response to the PUSCH. In this case, a content of the response to the PUSCH may usually include at least one of contention resolution information, RRC connection setup information, state transition indication information, a temporary cell radio network temporary identifier (TC-RNTI), a timing advance (TA), or an uplink grant (UL grant).

Alternatively, the terminal device may monitor the first search space to receive the common PDCCH, where the common PDCCH is used to schedule the PDSCH that carries the response message Msg B of the first message Msg A, and the response message Msg B includes the RAR. In this case, a content of the RAR may usually include at least one of a temporary cell radio network temporary identifier (TC-RNTI), a timing advance (TA), an uplink grant (UL grant), or a preamble index value.

Specifically, the response message Msg B may be sent to the terminal device by one common PDCCH and a common PDSCH corresponding to the common PDCCH, or may be sent to the terminal device by one specific PDCCH and a specific PDSCH corresponding to the specific PDCCH. In this embodiment of this application, the network device may determine, based on a detection status of the Msg A, to send the response message Msg B through the common PDCCH or the specific PDSCH.

In an example, if the network device successfully detects a preamble in a Msg A sent by one terminal device, and correctly detects a PUSCH, the network device may send a Msg B through a specific PDCCH and a specific PDSCH of the specific PDCCH. In a possible case, because the network device already successfully detects the PUSCH, the PUSCH needs to be detected based on the preamble, and response information of the PUSCH implicitly indicates response information of the preamble, it may be considered that the terminal device no longer needs the response RAR to the preamble, and a content included in the Msg B is the response information of the PUSCH. In another possible case, a content included in the Msg B may alternatively be complete response information of the Msg A, that is, include the response RAR to the preamble and the response to the PUSCH.

In another example, if the network device successfully detects a preamble in a Msg A sent by one terminal device, but does not correctly detect a PUSCH, the network device schedules a common PDSCH through a common PDCCH to carry a Msg B. Herein, a content included in the Msg B is the response RAR to the preamble, for example, may be responses RARs transmitted by all preambles in at least one Msg A.

In this embodiment of this application, the terminal device may determine, in a preconfiguration manner, that the two types of PDCCHs, namely, the common PDCCH and the specific PDCCH, may be monitored in a receiving phase of a response.

In an optional embodiment of this application, the terminal device may monitor the first search space based on a group radio network temporary identifier (group RNTI, G-RNTI) to receive the common PDCCH. In other words, the common PDCCH is scrambled by using the G-RNTI. The G-RNTI is determined based on a resource block in which a resource unit used when the first message is sent is located, and the resource block includes a time-frequency resource block used to send the random access preamble.

Specifically, the common PDCCH is scrambled by using one G-RNTI, and the G-RNTI is generated based on a resource block to which resource units used when a plurality of Msgs A are sent belong. Specifically, the resource units used when the Msgs A are sent include a resource unit used when the preamble is sent and a resource unit used when the PUSCH is sent. A resource block to which the resource unit of the preamble belongs includes a plurality of preamble sequences, and one preamble sequence corresponds to one preamble index. Therefore, the resource unit of the preamble may be defined as one preamble index in one resource block. A resource block of the resource unit of the PUSCH (may) includes a plurality of demodulation reference signal (DMRS) ports, and one DMRS port corresponds to one DMRS port number. Therefore, the resource unit of the PUSCH may be defined as one DMRS port number in one resource block.

In an example, one resource block includes a plurality of resource units, one Msg A occupies one resource unit, and different Msgs A occupy different resource units. One resource unit corresponds to one preamble index, one resource block corresponds to a plurality of preamble indexes, and one Msg A occupies one preamble index. In this case, the G-RNTI may be generated based on time-frequency domain information of the resource block to which the resource unit belongs. It can be learned that Msgs A corresponding to a plurality of different preamble indexes correspond to a same G-RNTI. Specially, the G-RNTI may be a random access radio network temporary identifier (RA-RNTI).

In an optional embodiment of this application, the terminal device may monitor the second search space based on a specific radio network temporary identifier S-RNTI to receive the specific PDCCH. In other words, the specific PDCCH may be scrambled by using the S-RNTI. The S-RNTI is determined based on a resource unit used when the first message is sent, or the S-RNTI is a cell radio network temporary identifier C-RNTI, or the S-RNTI is determined based on a contention resolution identifier in the first message. Usually, the S-RNTI may be a cell radio network temporary identifier C-RNTI only in a scenario in which the terminal has an RRC connection.

The resource unit used when the first message is sent includes at least one of an index of the random access preamble, a time-frequency resource block of the PUSCH, and an antenna port (the DMRS port) corresponding to the PUSCH.

In an implementation, the specific PDCCH is scrambled by one specific RNTI (S-RNTI), and the S-RNTI is generated by using a resource unit used when a single Msg A is sent. For example, one resource block includes a plurality of resource units, one Msg A occupies one resource unit, and different Msgs A occupy different resource units. One resource unit is one preamble index, a resource including a plurality of preamble indexes is one resource block, and one Msg A occupies only one preamble index. In this case, the S-RNTI is generated based on the preamble index occupied by the Msg A. It can be learned that Msgs A corresponding to a plurality of different preamble indexes correspond to different S-RNTIs.

The G-RNTI is generated based on a preamble resource block corresponding to a resource unit used when a plurality of Msgs A are sent. In an example, one preamble resource block is associated with a plurality of resource units, one Msg A occupies one resource unit, and different Msgs A occupy different resource units. One resource unit includes one preamble index, and one Msg A occupies one preamble index. In this case, the G-RNTI may be generated based on time-frequency domain information of the resource block. It can be learned that Msgs A corresponding to a plurality of different preamble indexes that are associated with a same preamble resource block correspond to a same G-RNTI.

It should be noted that, in this embodiment of this application, the G-RNTI is determined by a common resource corresponding to a plurality of resource units (the resource unit of the preamble and/or the resource unit of the PUSCH). In an example, if the resource block to which the resource unit of the PUSCH belongs corresponds to one antenna port (namely, a resource block defined by the resource unit of the PUSCH), the G-RNTI may be determined based on a resource block set of the PUSCH. In another example, if the resource block to which the resource unit of the PUSCH belongs corresponds to a plurality of ports (namely, an antenna port number defined by the resource unit of the PUSCH), the G-RNTI may be determined based on the resource block of the PUSCH.

Table 3 and Table 4 respectively list another example of generating a G-RNTI and another example of generating an S-RNTI in this embodiment of this application. Resource units used by the Msgs A include the resource unit of the preamble and the resource unit of the PUS CH.

In Table 3, there are two Msgs A: Msg A1 and Msg A2. A resource unit used to send the Msg A1 includes a preamble index 1 associated with a preamble resource block 1 and an antenna port 1 associated with a PUSCH resource block 1. A resource unit used to send the Msg A2 includes a preamble index 2 associated with the preamble resource block 1 and an antenna port 2 associated with the PUSCH resource block 1. In this case, G-RNTIs corresponding to the Msg A1 and the Msg A2 are the same, and are both generated based on the preamble resource block 1 and/or the PUSCH resource block 1. In addition, the Msg A1 and Msg A2 correspond to different S-RNTIs. Specifically, the S-RNTI corresponding to the Msg A1 may be generated based on the preamble index 1 and/or the antenna port 1, and the S-RNTI corresponding to the Msg A2 may be generated based on the preamble index 2 and/or the antenna port 2.

TABLE 3

| Msg A | Preamble resource unit | PUSCH resource unit | G-RNTI generation resource | S-RNTI |
|---|---|---|---|---|
| Msg A1 | Preamble index 1 associated with a preamble resource block 1 | Antenna port 1 associated with a PUSCH resource block 1 | Preamble resource block 1 and/or PUSCH resource block 1 | Preamble index 1 and/or antenna port 1 |
| Msg A2 | Preamble index 2 associated with the preamble resource block 1 | Antenna port 2 associated with the PUSCH resource block 1 | Preamble resource block 1 and/or PUSCH resource block 1 | Preamble index 2 and/or antenna port 2 |

In Table 4, there are two Msgs A: Msg A1 and Msg A2. A resource unit used to send the Msg A1 includes a preamble index 1 corresponding to a preamble occasion (PO) 1 and a PUSCH resource block 1. A resource unit used to send the Msg A2 includes a preamble index 2 corresponding to the preamble occasion 1 and a PUSCH resource block 2. In this case, G-RNTIs corresponding to the Msg A1 and the Msg A2 are the same, and are both generated based on the preamble occasion 1. In addition, the Msg A1 and Msg A2 correspond to different S-RNTIs. Specifically, the S-RNTI corresponding to the Msg A1 may be generated based on the preamble index 1 and/or the PUSCH resource block 1, and the S-RNTI corresponding to the Msg A2 may be generated based on the preamble index 2 and/or the PUSCH resource block 2.

TABLE 4

| Msg A | Preamble resource unit | PUSCH resource unit | G-RNTI generation resource | S-RNTI |
|---|---|---|---|---|
| Msg A1 | Preamble index 1 corresponding to a preamble occasion 1 | PUSCH resource block 1 | Preamble occasion 1 | Preamble index 1 and/or PUSCH resource block 1 |
| Msg A2 | Preamble index 2 corresponding to the preamble occasion 1 | PUSCH resource block 2 | Preamble occasion 1 | Preamble index 2 and/or PUSCH resource block 2 |

It should be noted that a preamble occasion is a resource granularity smaller than a preamble resource block. Usually, one preamble resource block includes a plurality of preamble occasions, and one occasion includes a plurality of preamble indexes.

In another implementation, for a terminal device having a radio resource control (RRC) connection, the S-RNTI may be a cell radio network temporary identifier C-RNTI.

In another implementation, for a terminal device having no RRC connection, the S-RNTI may also be obtained from terminal identification information used for contention resolution in the Msg A sent by the terminal device. For example, a part of the terminal device identification information may be intercepted as the S-RNTI. Clearly, if the network device can correctly detect, from the Msg A, the terminal identification information that is of the terminal device and that is used for the contention resolution, the network device may obtain the S-RNTI, and use the S-RNTI to scramble the specific PDCCH and the specific PDSCH corresponding to the specific PDCCH. Correspondingly, the terminal device may monitor the second search space based on the S-RNTI to receive the specific PDCCH.

Without loss of generality, because a G-RNTI and/or an S-RNTI determined by one terminal device in the 2-step RACH procedure may be the same as an RA-RNTI determined by another terminal device in the 4-step RACH procedure, contention is caused. To avoid such a case, the G-RNTI and/or the S-RNTI in the 2-step RACH may be determined not only through the resource of the preamble sequence and/or the resource of the PUSCH, but also through calculation based on a fixed start offset value, to ensure that the G-RNTI and/or the S-RNTI in the 2-step RACH are different from the RA-RNTI generated by another terminal device.

In this response sending mechanism, usually, the network device has only one response for sending one Msg A. To be specific, if the network device correctly detects a preamble and/or a PUSCH in one Msg A, a response message Msg B corresponding to the Msg A is sent through one of the common PDCCH and the specific PDCCH. Then, the terminal device obtains the needed response message by correctly receiving the PDSCH indicated by the common PDCCH or the specific PDSCH indicated by the specific PDCCH. In other words, the terminal device herein does not correctly receive the PDSCH indicated by the common PDCCH and the specific PDSCH indicated by the specific PDCCH at the same time.

If a contention-based sending scenario is considered, a plurality of users may select a same Msg A resource unit for sending. In this scenario, if the network device can correctly detect a plurality of different Msgs A on a same Msg A resource unit, the network device may feed back different Msgs B in the following manner A and manner B.

Manner A: If the network device correctly detects PUSCHs of the plurality of Msgs A, a plurality of different specific PDCCHs are used to indicate to send a plurality of different corresponding specific PDSCHs.

Manner B: If the network device correctly detects the preamble of the Msg A1 and the PUSCH of the Msg A2, the network device sends the common PDCCH and the specific PDCCH, that is, sends a response to the preamble of the Msg A1 through the common PDSCH indicated by the common PDCCH, and sends a response to the PUSCH of the Msg A2 through the specific PDSCH indicated by the specific PDCCH.

In this contention scenario, if the network device is capable of detecting a plurality of Msgs A on one resource unit and can complete a corresponding feedback, one terminal device may correctly receive both the common PDSCH indicated by the common PDCCH and the specific PDSCH indicated by the specific PDCCH. To avoid an unclear behavior of the terminal device, a discarding rule may be agreed on in this embodiment of this application. In an example, if the terminal device correctly receives the common PDSCH indicated by the common PDCCH and the specific PDSCH indicated by the specific PDCCH, the terminal device may discard detection information corresponding to the common PDCCH.

In another example of the discarding rule, if the terminal device correctly receives the specific PDSCH indicated by the specific PDCCH, but a user identifier that is included in the specific PDSCH and that is used for contention resolution is not of the terminal device, the terminal device discards the specific PDSCH.

Therefore, in this embodiment of this application, the network device can adaptively adjust a transmission manner of the Msg B based on a detection status of the Msg A, so that not only efficient transmission of different Msgs B is supported in a manner in which the specific PDCCH indicates the specific PDSCH, but also response transmission of a part of Msgs A that are correctly detected is supported in a manner in which the common PDCCH indicates the common PDSCH. Therefore, flexible and efficient response transmission of the Msg B can be implemented in this embodiment of this application.

Manner 2

The terminal device may monitor the first search space to receive the common PDCCH, and the common PDCCH is used to schedule the RAR. Then, the terminal may monitor the second search space based on the RAR to receive the specific PDCCH, and the specific PDCCH is used to schedule the response to the PUSCH.

Specifically, the response message Msg B may include a first part and a second part. The first part includes the common PDCCH and the common PDSCH corresponding to the common PDCCH, and the PDSCH carries the response to the preamble in the Msg A. The second part includes the specific PDCCH and the specific PDSCH corresponding to the specific PDCCH, and the PDSCH carries the response to the PUSCH transmitted in the Msg A.

In this embodiment of this application, the network device may determine, based on the detection status of the Msg A, to use only the common PDCCH or a combination of the common PDCCH and the specific PDSCH for sending.

In an example, if the network device successfully detects a preamble in a Msg A sent by one terminal device, the network device sends the first part of the Msg B, namely, a response to the preamble in the Msg A, namely, a RAR, through the common PDSCH scheduled by the common PDCCH.

If the network device further successfully detects a PUSCH in a Msg A sent by one terminal device, the network device may further send the second part of the Msg B, namely, a response to the PUSCH in the Msg A, through the specific PDSCH scheduled by the specific PDCCH. In this case, the terminal device may further monitor and receive, based on partial information in the RAR, the specific PDCCH and the specific PDSCH scheduled by the specific PDCCH. For example, the partial information may be a TC-RNTI.

In this embodiment of this application, the terminal device may determine, in a preconfiguration manner, that in the receiving phase of the response, the terminal device may first monitor the common PDCCH, and then determine, based on a detection status of the common PDCCH, whether to detect the specific PDCCH. In other words, if the terminal device successfully detects the common PDCCH, the terminal device obtains the TC-RNTI from the common PDSCH scheduled by the common PDCCH, and then may continue to monitor the specific PDCCH based on the TC-RNTI. If the terminal device fails to detect the common PDCCH, the terminal device cannot obtain the TC-RNTI. Consequently, the terminal device may no longer continue to monitor the specific PDCCH.

In an optional embodiment of this application, the terminal device may monitor the first search space based on a group radio network temporary identifier G-RNTI to receive the common PDCCH. Specifically, for the G-RNTI, refer to the descriptions in Manner 1. For brevity, details are not described herein again.

In an optional embodiment of this application, the terminal device may monitor the second search space based on a specific radio network temporary identifier S-RNTI to receive the specific PDCCH. Specifically, for the S-RNTI, refer to the descriptions in Manner 1. For brevity, details are not described herein again.

In an optional embodiment of this application, the terminal device may monitor the second search space based on the response to the preamble in the Msg A, namely, the temporary cell radio network temporary identifier TC-RNTI carried in the RAR, to receive the specific PDCCH.

In an implementation, if the terminal device accurately receives the response to the preamble in the Msg A based on the common PDCCH and the common PDSCH, the terminal device monitors, based on the TC-RNTI in the response, the specific PDCCH and the specific PDSCH that are scrambled by using the TC-RNTI.

Optionally, the network device may send indication information to the terminal device, and the indication information is used to indicate a slot for monitoring the specific PDSCH. In an example, the network device may send the indication information to the terminal device by using broadcast signaling.

Alternatively, interval information may be predefined, and the interval information is used to indicate a quantity of slots between a slot for monitoring the common PDCCH and a slot for monitoring the specific PDCCH. In an example, the interval information may be k. In this case, when the terminal device detects the common PDCCH in a slot n, the terminal device also needs to monitor the specific PDCCH in a slot n+k.

Optionally, in this embodiment of this application, the slot may alternatively be replaced with a time-domain resource such as a subframe and an OFDM symbol. This is not limited in this embodiment of this application.

For this response sending mechanism, usually, when the network device sends a response to one Msg A, a corresponding terminal device may have one of the following two cases.

Case 1: The terminal device accurately receives, based on the common PDCCH and the indicated PDSCH, the response RAR corresponding to the preamble in the Msg A sent by the terminal device.

Case 2: The terminal device accurately receives, based on the common PDCCH and the indicated PDSCH, the response RAR corresponding to the preamble in the Msg A sent by the terminal device, and accurately receives, based on the TC-RNTI included in the response RAR, a user identifier that is used for contention resolution and that is in the specific PDCCH.

It should be noted that, for the case 2, it means that even if the terminal device correctly monitors the specific PDCCH and the indicated specific PDSCH, if the PDSCH does not include the user identifier that is used for the contention resolution and that is in the PUSCH in the Msg A sent by the terminal device, the terminal device needs to discard the specific PDCCH and the indicated PDSCH.

Therefore, in this embodiment of this application, the network device can adaptively adjust a transmission manner of the Msg B based on a detection status of the Msg A, so that not only efficient transmission of different Msgs B is supported in a manner in which the specific PDCCH indicates the specific PDSCH, but also response transmission of a part of Msgs A that are correctly detected is supported in a manner in which the common PDCCH indicates the common PDSCH. Therefore, flexible and efficient response transmission of the Msg B can be implemented in this embodiment of this application. In addition, in this embodiment of this application, if the terminal device does not accurately detect, based on the common PDCCH and the common PDSCH, the response corresponding to the preamble in the sent Msg A, the terminal device does not need to monitor the specific PDCCH. Therefore, in this embodiment of this application, complexity and power consumption of the terminal can be further reduced.

Optionally, in this embodiment of this application, the terminal device may further receive first configuration information, where the first configuration information includes a window length of a first time window and a window length of a second time window, the window length of the first time window is a length of a time window used to receive the response message of the first message, the window length of the second time window is a length of a time window used to receive a response message of a second message, and the second message includes only the random access preamble.

Specifically, the terminal device supporting the 2-step RACH may also support the 4-step RACH at the same time, and the 2-step RACH and the 4-step RACH may correspond to application scenarios with different latency requirements. In addition, in a scenario corresponding to the 2-step RACH and a scenario corresponding to the 4-step RACH, the terminal device has different processing latencies for receiving responses and different capacity requirements for control channels. Therefore, in the two different scenarios of the 2-step RACH and the 4-step RACH, window lengths for monitoring receiving of random access response messages are also different. In this case, the terminal device may receive information (e.g., through the first configuration information) about two types of receive time windows configured by the network device. In an example, the first time window is a time window used to receive the response message of the Msg A in the 2-step RACH scenario, and the second time window is a time window used to receive the response message of the Msg 1 in the 4-step RACH scenario.

In a possible implementation, the first time window starts after a time-domain symbol occupied by the PUSCH.

Figure 4:
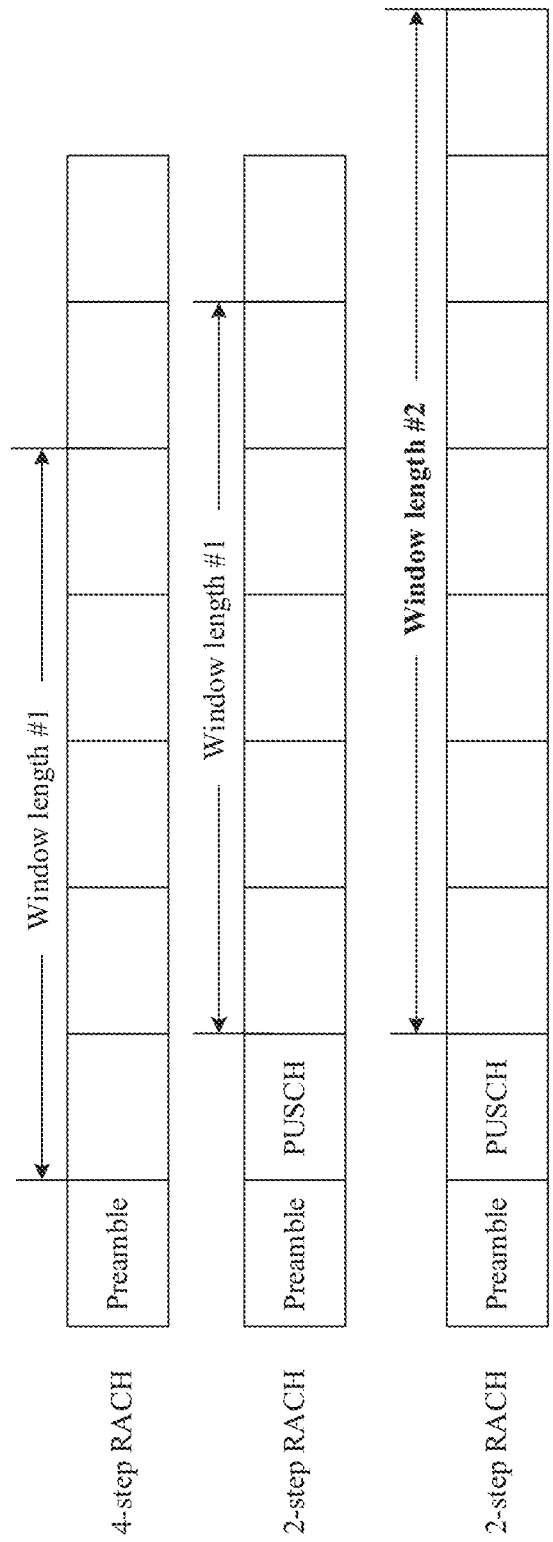
FIG. 4 is a schematic diagram of a window length of a time window for receiving a response message according to an embodiment of this application.

FIG. 4 is a schematic diagram of a window length of a time window for receiving a response message according to an embodiment of this application. As shown in FIG. 4, window lengths of time windows for receiving random access response messages in a 4-step RACH procedure and a 2-step RACH procedure may be the same (where both are window lengths #1), or may be different (e.g., the window length of the time window in the 4-step RACH procedure is a window length #1, and the window length of the time window in the 2-step RACH procedure is a window length #2). Further, in the 4-step RACH procedure, a time window for receiving a response message of a Msg 1 starts after a time-domain symbol occupied by a preamble preamble in the Msg 1. In the 2-step RACH procedure, a time window for receiving a response message of a Msg A starts after a time-domain symbol occupied by a PUSCH in the Msg A. In this implementation, window length information of the time window for receiving the random access response message in the 2-step RACH procedure may be indicated by using signaling, or may be predefined as the same as that of the time window for receiving the random access response message in the 4-step RACH procedure. This is not limited in this embodiment of this application.

Figure 5:
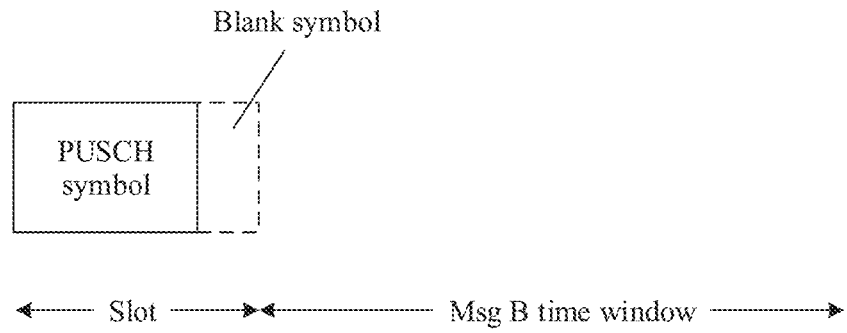
FIG. 5 is a schematic diagram of a Msg B time window according to an embodiment.

In an optional embodiment, the time-domain symbol occupied by the PUSCH may include a blank symbol, and the blank symbol belongs to a part of the PUSCH, or associates with and corresponds to the PUSCH and is not used to send any signal. In an example, the blank symbol may be a blank OFDM symbol, and may be specifically used for a guard time. FIG. 5 is a schematic diagram of a Msg B time window according to an embodiment. The Msg B time window is a time window for receiving a Msg B. As shown in FIG. 5, in this case, the Msg B time window starts after a blank symbol.

Therefore, in this embodiment of this application, a network device may flexibly indicate, based on different application scenarios of a 2-step RACH and a 4-step RACH, a start position of a time window for receiving a response message.

Optionally, in this embodiment of this application, a terminal device may alternatively receive second configuration information, where the second configuration information includes a window length of a third time window and a window length of a fourth time window, the window length of the third time window is a length of a time window used to receive the RAR, and the window length of the fourth time window is a length of a time window used to receive a response to a PUSCH.

Specifically, when the response message Msg B includes a first part of a response to a preamble in a Msg A sent by a common PDCCH and a common PDSCH corresponding to the common PDCCH, and a second part, of a response to the PUSCH in a Msg A, that is sent by a specific PDCCH and a specific PDSCH corresponding to the specific PDCCH, corresponding time windows may be respectively configured for the first part and the second part (e.g., through the second configuration information). In an example, the third time window is a time window used to receive the response to the preamble in the Msg A, and the fourth time window is a time window used to receive the response to the PUSCH in the Msg A.

In a possible implementation, the third time window starts from a time-domain symbol after a time-domain symbol of the random access preamble preamble. In other words, after sending the preamble, the terminal device may enter a receiving phase of the response to the preamble, and monitor the common PDCCH in a first search space.

In a possible implementation, the fourth time window starts after the common PDSCH received by the terminal device, and the common PDSCH is scheduled by the common PDCCH. In other words, after detecting the common PDCCH and receiving the common PDSCH scheduled by the common PDCCH, the terminal device may enter a receiving phase of the response to the PUSCH, and monitor the specific PDCCH in a second search space. In a possible case, the terminal device may obtain a TC-RNTI based on the common PDSCH, and then monitor the specific PDCCH based on the TC-RNTI.

Figure 6:
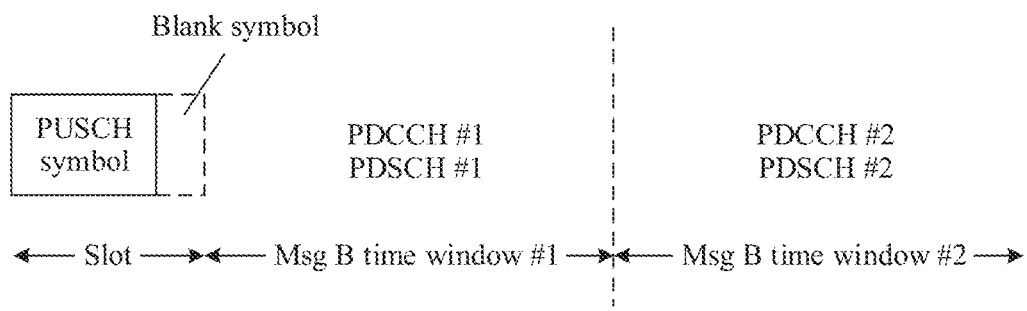
FIG. 6 is a schematic diagram of a Msg B time window according to an embodiment.

FIG. 6 is a schematic diagram of a Msg B time window according to an embodiment. As shown in FIG. 6, two Msg B time windows are included, and are respectively a Msg B time window #1 and a Msg B time window #2. A terminal device receives a PDCCH #1 and a PDSCH #1 in the Msg B time window #1, and receives a PDCCH #2 in the Msg B time window #2. In an example, the PDCCH #1 may be a common PDCCH, the PDSCH #1 may be a common PDSCH, the PDCCH #2 may be a specific PDCCH, and the PDSCH #2 may be a specific PDSCH.

It should be noted that the Msg B time window #1 in FIG. 6 starts after a PUSCH symbol, but FIG. 6 is merely used as an example but not a limitation. It may be understood that, in this embodiment of this application, the Msg B time window #1 may alternatively start after a preamble. This is not limited in this embodiment of this application.

Optionally, in this embodiment of this application, a start position of a time window for receiving a response message may be further determined based on a processing latency (processing time) of a network device for a PUSCH and/or a processing latency (processing time) of a terminal device for the common PDSCH.

Figure 7:
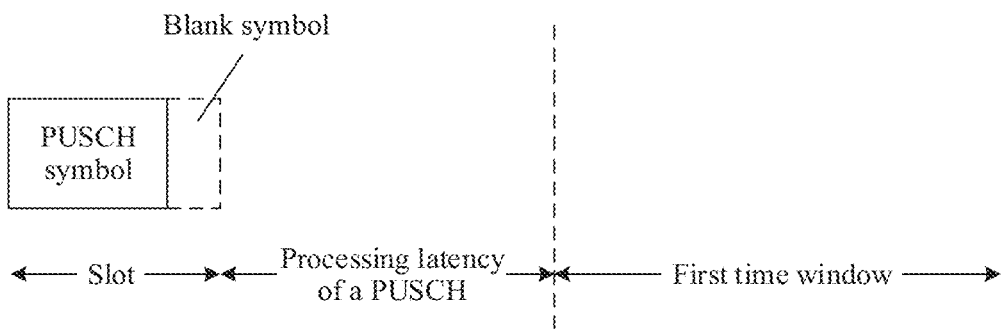
FIG. 7 is a schematic diagram of a first time window according to an embodiment.

In an example, as shown in FIG. 7, a start position of a first time window may be after a PUSCH symbol and a time-domain length equal to a processing latency of a PUSCH. The PUSCH symbol may alternatively not include a blank symbol, and the time-domain length may be a slot or a subframe. This is not limited herein.

Figure 8:
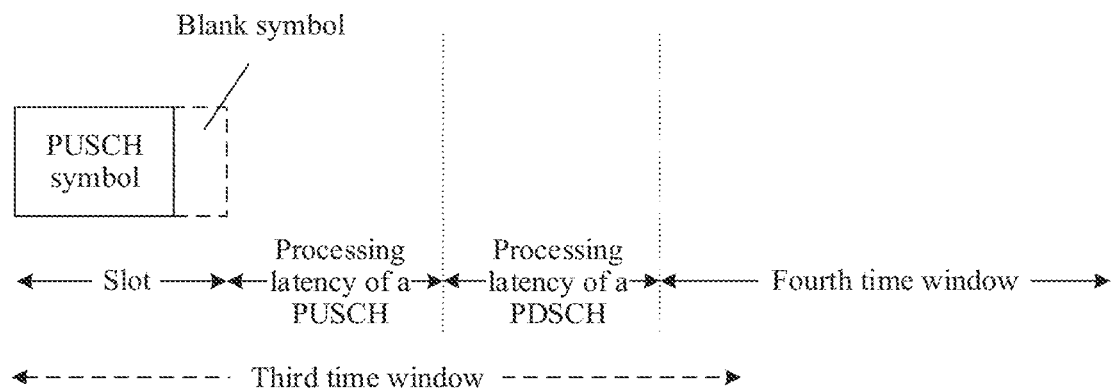
FIG. 8 is a schematic diagram of a third time window and a fourth time window according to an embodiment.

In another example, as shown in FIG. 8, a start position of a fourth time window may be after a time-domain length equal to a processing latency of a PDSCH. Specifically, in FIG. 8, a window length of the fourth time window may start after a common PDSCH and a processing latency of the common PDSCH. In this case, a time (including the common PDSCH) before the common PDSCH belongs to a window length of a third time window (where an example of the third time window is shown in FIG. 8). Therefore, the third time window herein may also be used to replace related time information of a PUSCH. It may be understood that, in this embodiment of this application, when it is determined that the fourth time window starts after the common PDSCH (or the common PDSCH and the processing latency of the common PDSCH), the defined third time window may not end. In this case, the window length of the third time window and the window length of the fourth time window have an overlapped part.

In an optional embodiment, the network device may send interval indication information to the terminal device, or may predefine the interval indication information, and the interval indication information is used to indicate a quantity of symbols between the start position of the time window for receiving the response message and the last symbol in the PUSCH.

Therefore, in this embodiment of this application, the network device may determine, based on the guard time for PUSCH transmission and the processing latency of the PUSCH and/or the PDSCH, the start position of the time window for receiving the response message, so that power consumption of the terminal device can be further reduced.

In an optional embodiment, the second search space may be determined based on an S-RNTI by scrambling the specific PDCCH. Specifically, in the 2-step RACH procedure, the terminal device needs to monitor the two types of search spaces in most of time, to separately monitor the received common PDCCH and the received specific PDCCH. When the terminal device that monitors the second search space does not obtain the TC-RNTI, the terminal device may determine a start position of the second search space based on the S-RNTI. Specifically, for the S-RNTI, refers to the foregoing descriptions. For brevity, details are not described herein again. In an example, the start position $P_{starting}$ of the second search space may be determined through the following formula:

$$P_{starting} = f(\text{S-RNTI}), \text{ where } f(\text{S-RNTI}) \text{ is a hash (harsh) function.}$$

Based on the method in the foregoing embodiments, the following describes a communications apparatus provided in this application.

Figure 9:
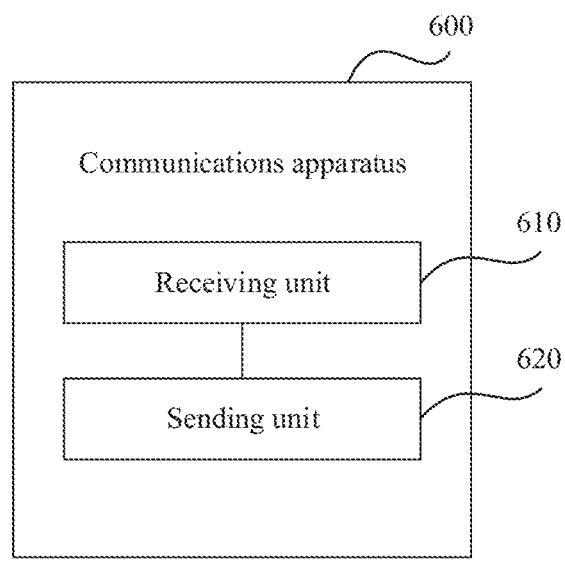
FIG. 9 is a schematic block diagram of a communications apparatus according to an embodiment of this application.

FIG. 9 is a schematic structural diagram of a communications apparatus 600 according to this application. The communications apparatus 600 may be used for random access, and may also be referred to as a random access apparatus. The communications apparatus 600 includes a receiving unit 610 and a sending unit 620.

The receiving unit 610 is configured to receive a first control channel resource set used to monitor a common physical downlink control channel PDCCH and a second control channel resource set used to monitor a specific PDCCH that are sent by a network device, where the first control channel resource set corresponds to a first search space, and the second control channel resource set corresponds to a second search space.

The sending unit 620 is configured to send a first message to the network device, where the first message includes a random access preamble and a physical uplink shared channel PUSCH.

The receiving unit 610 is further configured to monitor the first search space and the second search space to receive at least one of the common PDCCH and the specific PDCCH that are sent by the network device, where the at least one of the common PDCCH and the specific PDCCH is used to schedule a PDSCH that carries a response message of the first message, the response message includes at least one of a response to the random access preamble and a response to the PUSCH, the response to the random access preamble is carried on a PDSCH scheduled by the common PDCCH, and the response to the PUSCH is carried on a specific PDSCH scheduled by the specific PDCCH.

Therefore, in this embodiment of this application, the terminal device monitors the first search space and the second search space to receive the at least one of the common PDCCH and the specific PDCCH, where the at least one of the common PDCCH and the specific PDCCH is used to schedule the PDSCH that carries the response message of the first message, the first message includes the preamble and the PUSCH, and the response message includes the at least one of the response RAR to the preamble and the response to the PUSCH. In comparison with the prior art in which a PDSCH that carries a Msg B is scheduled by one common PDCCH, in this embodiment of this application, transmission efficiency of the response message can be improved based on the response message scheduled by a plurality of PDCCHs.

Optionally, in this embodiment of this application, the receiving unit 610 is specifically configured to: monitor the second search space to receive the specific PDCCH, where the specific PDCCH is used to schedule the PDSCH that carries the response message of the first message, and the response message includes the response to the PUSCH; or monitor the first search space to receive the common PDCCH, where the common PDCCH is used to schedule the PDSCH that carries the response message of the first message, and the response message includes the response to the random access preamble.

Optionally, in this embodiment of this application, the receiving unit 610 is specifically configured to: monitor the first search space to receive the common PDCCH, where the common PDCCH is used to schedule the response to the random access preamble; or monitor the second search space based on the response to the random access preamble to receive the specific PDCCH, where the specific PDCCH is used to schedule the PDSCH that carries the response to the PUSCH.

Optionally, in this embodiment of this application, the receiving unit 610 is specifically configured to: monitor the second search space based on a specific radio network temporary identifier S-RNTI to receive the specific PDCCH, where the S-RNTI is determined based on a resource unit used when the first message is sent, or the S-RNTI is a cell radio network temporary identifier C-RNTI, or the S-RNTI is determined based on a contention resolution identifier in the first message, where the resource unit used when the first message is sent includes at least one of an index of the random access preamble, a time-frequency resource block of the PUSCH, and an antenna port corresponding to the PUSCH.

Optionally, in this embodiment of this application, the receiving unit 610 is specifically configured to: monitor the second search space based on a temporary cell radio network temporary identifier TC-RNTI carried in the response to the random access preamble to receive the specific PDCCH.

Optionally, in this embodiment of this application, the receiving unit 610 is specifically configured to: monitor the first search space based on a group radio network temporary identifier G-RNTI to receive the common PDCCH, where the G-RNTI is determined based on a resource block in which the resource unit used when the first message is sent is located, and the resource block includes a time-frequency resource block used to send the random access preamble.

Optionally, in this embodiment of this application, the apparatus 600 may further include an obtaining unit, configured to obtain first configuration information, where the first configuration information includes a window length of a first time window and a window length of a second time window, the window length of the first time window is a length of a time window used to receive the response message of the first message, the window length of the second time window is a length of a time window used to receive a response message of a second message, and the second message includes only the random access preamble.

Optionally, in this embodiment of this application, the obtaining unit may be further configured to obtain second configuration information, where the second configuration information includes a window length of a third time window and a window length of a fourth time window, the window length of the third time window is a length of a time window used to receive the RAR, and the window length of the fourth time window is a length of a time window used to receive the response to the PUSCH.

Optionally, the receiving unit 610 and/or the sending unit 620 may also be collectively referred to as a transceiver unit (module) or a communications unit, and may be separately configured to perform the method embodiments and the receiving and sending steps of the terminal device in FIG. 2 or FIG. 3. Optionally, the communications apparatus 600 may further include a processing unit and/or a storage unit. The processing unit is configured to process an instruction sent by the sending unit, or process an instruction received by the receiving unit. The storage unit is configured to store instructions executed by the communications unit and the processing unit.

The communications apparatus 600 is a terminal device, or may be a chip in a terminal device. When the communications apparatus is the terminal device, the processing unit may be a processor, and the communications unit may be a transceiver. The communications apparatus may further include a storage unit, and the storage unit may be a memory. The storage unit is configured to store an instruction, and the processing unit executes the instruction stored in the storage unit, so that the communications device performs the foregoing method. When the communications apparatus is the chip in the terminal device, the processing unit may be a processor, and the communications unit may be an input/output interface, a pin, a circuit, or the like. The processing unit executes an instruction stored in a storage unit, so that the communications apparatus performs an operation performed by the terminal device in the foregoing method embodiments. The storage unit may be a storage unit (e.g., a register or a cache) in the chip, or may be a storage unit (e.g., a read-only memory or a random access memory) outside the chip in the terminal device.

It may be clearly understood by a person skilled in the art that, for steps performed by the communications apparatus 600 and corresponding beneficial effects, refer to related descriptions of the terminal device in the foregoing method embodiments. For brevity, details are not described herein again.

Figure 10:
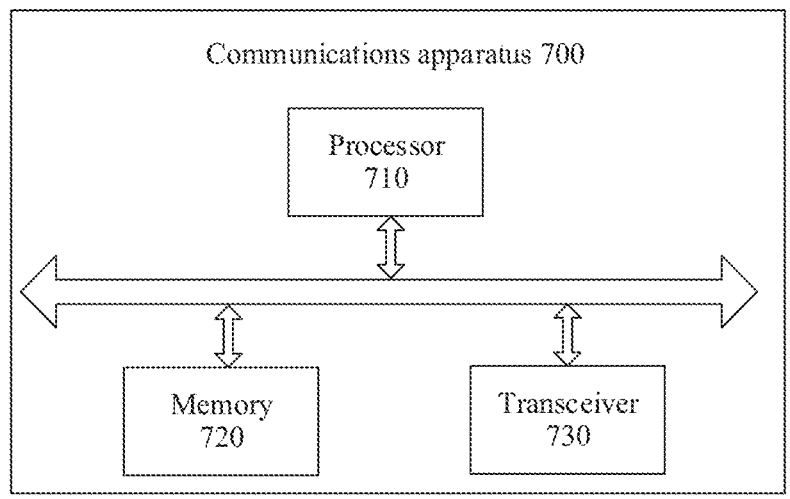
FIG. 10 is a schematic block diagram of another communications apparatus according to an embodiment of this application.

It should be understood that the receiving unit 610 and the sending unit 620 may be implemented by a transceiver. The processing unit may be implemented by a processor. The storage unit may be implemented by a memory. As shown in FIG. 10, a communications apparatus 700 may include a processor 710, a memory 720, and a transceiver 730. The communications apparatus 700 may be used for random access, and may also be referred to as a random access apparatus.

The communications apparatus 600 shown in FIG. 9 or the communications apparatus 700 shown in FIG. 10 can implement the embodiments and the steps performed by the terminal device in FIG. 2 or FIG. 3. For similar descriptions, refer to the descriptions in the corresponding method. To avoid repetition, details are not described herein again.

Figure 11:
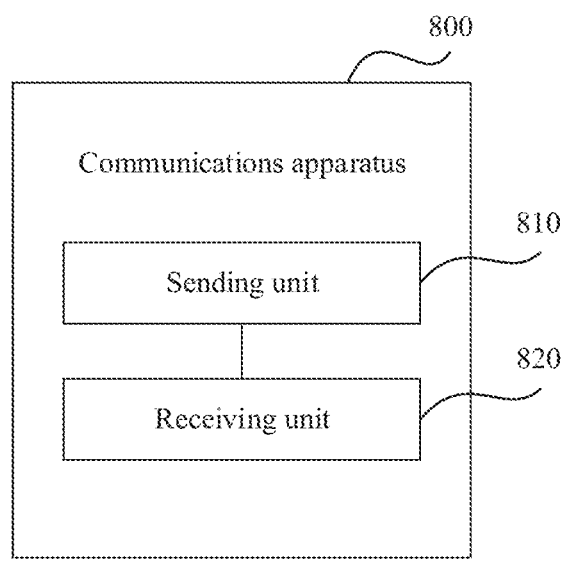
FIG. 11 is a schematic block diagram of still another communications apparatus according to an embodiment of this application.

FIG. 11 is a schematic structural diagram of a communications apparatus 800 according to this application. The communications apparatus 800 may be used for random access, and may also be referred to as a random access apparatus. The communications apparatus 800 includes a sending unit 810 and a receiving unit 820.

The sending unit 810 is configured to send, to a terminal device, a first control channel resource set used to monitor a common physical downlink control channel PDCCH and a second control channel resource set used to monitor a specific PDCCH, where the first control channel resource set corresponds to a first search space, and the second control channel resource set corresponds to a second search space.

The receiving unit 820 is configured to receive a first message sent by the terminal device, where the first message includes a random access preamble and a physical uplink shared channel PUSCH.

The sending unit 810 is further configured to send at least one of the common PDCCH and the specific PDCCH to the terminal device, where the at least one of the common PDCCH and the specific PDCCH is used to schedule a PDSCH that carries a response message of the first message, the response message includes at least one of a response to the random access preamble and a response to the PUSCH, the response to the random access preamble is carried on a PDSCH scheduled by the common PDCCH, and the response to the PUSCH is carried on a specific PDSCH scheduled by the specific PDCCH.

Therefore, in this embodiment of this application, the terminal device monitors the first search space and the second search space to receive the at least one of the common PDCCH and the specific PDCCH, where the at least one of the common PDCCH and the specific PDCCH is used to schedule the PDSCH that carries the response message of the first message, the first message includes the preamble and the PUSCH, and the response message includes the at least one of the response RAR to the preamble and the response to the PUSCH. In comparison with the prior art in which a PDSCH that carries a Msg B is scheduled by one common PDCCH, in this embodiment of this application, transmission efficiency of the response message can be improved based on the response message scheduled by a plurality of PDCCHs.

Optionally, in this embodiment of this application, the sending unit 810 is specifically configured to: send the specific PDCCH to the terminal device, where the specific PDCCH is used to schedule the PDSCH that carries the response message of the first message, and the response message includes the response to the PUSCH; or send the common PDCCH to the terminal device, where the common PDCCH is used to schedule the PDSCH that carries the response message of the first message, and the response message includes the response to the random access preamble.

Optionally, in this embodiment of this application, the sending unit 810 is specifically configured to: send the common PDCCH to the terminal device, where the common PDCCH is used to schedule the response to the random access preamble; or send the specific PDCCH to the terminal device based on the response to the random access preamble, where the specific PDCCH is used to schedule the PDSCH that carries the response to the PUSCH.

Optionally, in this embodiment of this application, the specific PDCCH is scrambled based on a specific radio network temporary identifier S-RNTI, and the S-RNTI is determined based on a resource unit used when the first message is sent, or the S-RNTI is a cell radio network temporary identifier C-RNTI, or the S-RNTI is determined based on a contention resolution identifier in the first message, where the resource unit used when the first message is sent includes at least one of an index of the random access preamble, a time-frequency resource block of the PUSCH, and an antenna port corresponding to the PUSCH.

Optionally, in this embodiment of this application, the specific PDCCH is scrambled based on a temporary cell radio network temporary identifier TC-RNTI included in the response to the random access preamble, and the TC-RNTI is sent through the PDSCH that carries the response to the random access preamble and that is scheduled by the common PDCCH.

Optionally, in this embodiment of this application, the common PDCCH is scrambled based on a group radio network temporary identifier G-RNTI, the G-RNTI is determined based on a resource block in which the resource unit used when the first message is received is located, and the resource block includes a time-frequency resource block used to send the random access preamble.

Optionally, in this embodiment of this application, the sending unit 810 is further configured to send first configuration information to the terminal device, where the first configuration information includes a window length of a first time window and a window length of a second time window, the window length of the first time window is a length of a time window used to receive the response message of the first message, the window length of the second time window is a length of a time window used to receive a response message of a second message, and the second message includes only the random access preamble.

Optionally, in this embodiment of this application, the sending unit 810 is further configured to send second configuration information to the terminal device, where the second configuration information includes a window length of a third time window and a window length of a fourth time window, the window length of the third time window is a length of a time window used to receive the response to the random access preamble, and the window length of the fourth time window is a length of a time window used to receive the response to the PUSCH.

Optionally, the sending unit 810 and/or the receiving unit 820 may also be collectively referred to as a transceiver unit (module) or a communications unit, and may be separately configured to perform the method embodiments and the receiving and sending steps of the network device in FIG. 2 or FIG. 3. Optionally, the communications apparatus 800 may further include a processing unit and/or a storage unit. The processing unit is configured to process an instruction sent by the sending unit, or process an instruction received by the receiving unit. The storage unit is configured to store instructions executed by the communications unit and the processing unit.

The apparatus 800 is a network device in the method embodiments, or may be a chip in a network device. When the apparatus is the network device, the processing unit may be a processor, and the communications unit may be a transceiver. The apparatus may further include a storage unit, and the storage unit may be a memory. The storage unit is configured to store an instruction, and the processing unit executes the instruction stored in the storage unit, so that the communications device performs the foregoing method. When the apparatus is the chip in the network device, the processing unit may be a processor, and the communications unit may be an input/output interface, a pin, a circuit, or the like. The processing unit executes an instruction stored in a storage unit, so that the communications device performs an operation performed by the network device in the foregoing method embodiments. The storage unit may be a storage unit (e.g., a register or a cache) in the chip, or may be a storage unit (e.g., a read-only memory or a random access memory) outside the chip in the network device.

It may be clearly understood by a person skilled in the art that, for steps performed by the apparatus 800 and corresponding beneficial effects, refer to related descriptions of the network device in the foregoing method embodiments. For brevity, details are not described herein again.

Figure 12:
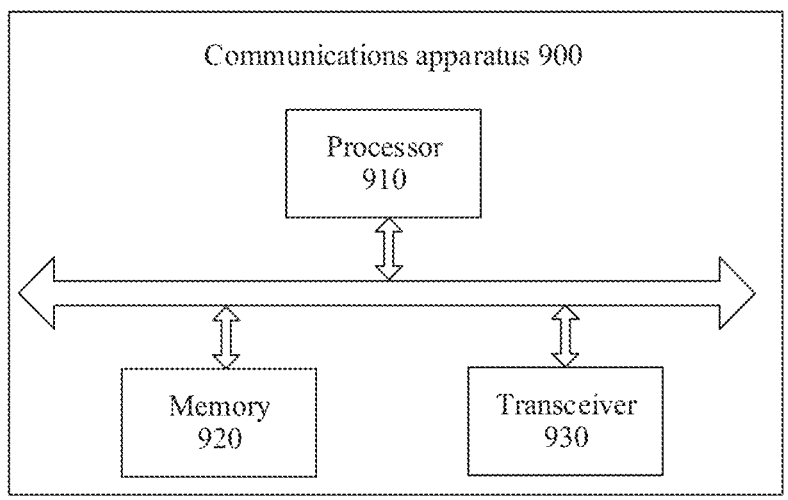
FIG. 12 is a schematic block diagram of still another communications apparatus according to an embodiment of this application.

It should be understood that the sending unit 810 and the receiving unit 820 may be implemented by a transceiver, and the processing unit may be implemented by a processor. The storage unit may be implemented by a memory. As shown in FIG. 12, a communications apparatus 900 may include a processor 910, a memory 920, and a transceiver 930. The communications apparatus 900 may be used for random access, and may also be referred to as a random access apparatus.

The communications apparatus 800 shown in FIG. 11 or the communications apparatus 900 shown in FIG. 12 can implement the method embodiments and the steps performed by the network device in FIG. 2 or FIG. 3. For similar descriptions, refer to the descriptions in the corresponding method. To avoid repetition, details are not described herein again.

The network device and the terminal device in the foregoing apparatus embodiments correspond to the terminal device and the network device in the method embodiments. A corresponding module or unit performs a corresponding step. For example, a communications unit (or a transceiver unit or a transceiver) performs a sending step and/or a receiving step in the method embodiments (or a sending unit and a receiving unit respectively perform the sending step and the receiving step), and another step other than the sending step and the receiving step may be performed by a processing unit (a processor). For a function of a specific unit, refer to the corresponding method embodiments. The sending unit and the receiving unit may form a transceiver unit, and a transmitter and a receiver may form a transceiver, to jointly implement receiving and sending functions in the method embodiments. There may be one or more processors.

It should be understood that division of the foregoing units is merely function division, and there may be another division method during actual implementation.

The terminal device or the network device may be a chip, and the processing unit may be implemented by hardware or may be implemented by software. When the processing unit is implemented by using hardware, the processing unit may be a logic circuit, an integrated circuit, or the like. When the processing unit is implemented by using software, the processing unit may be a general-purpose processor, and is implemented by reading software code stored in a storage unit. The storage unit may be integrated into the processor, or may be located outside the processor and exist independently.

Figure 13:
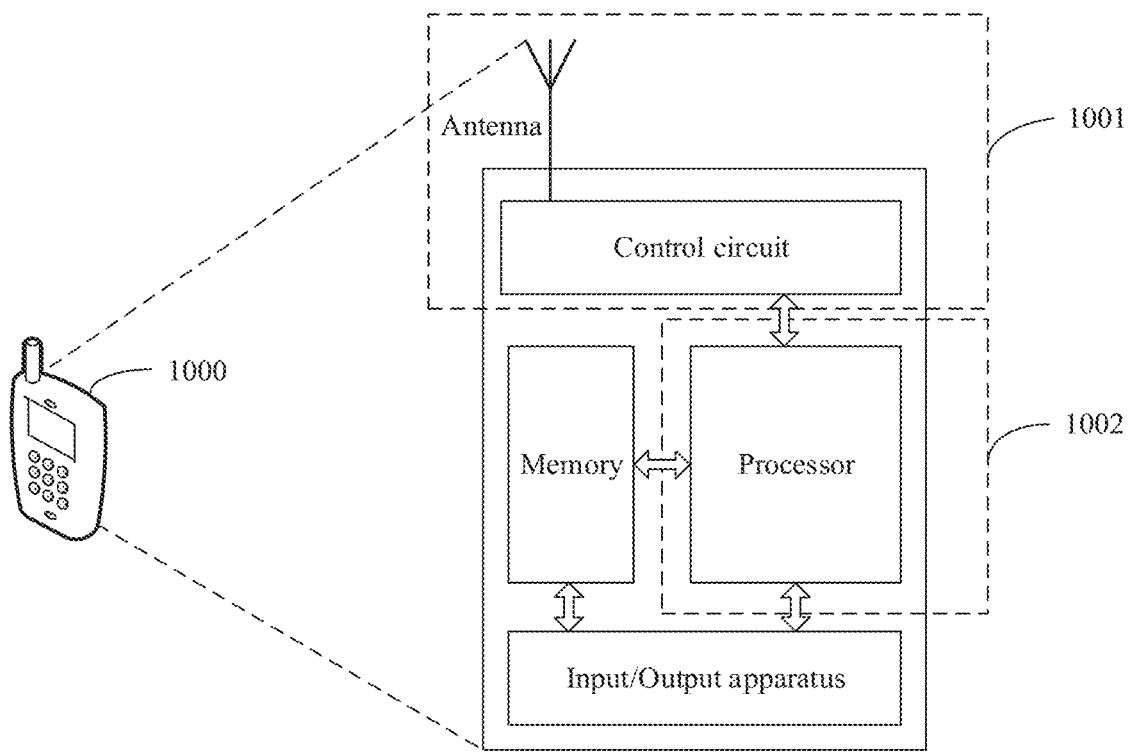
FIG. 13 is a schematic structural diagram of a terminal device according to an embodiment of this application.

FIG. 13 is a schematic structural diagram of a terminal device 1000 according to this application. For ease of description, FIG. 13 shows only main components of the terminal device. As shown in FIG. 13, the terminal device 1000 includes a processor, a memory, a control circuit, an antenna, and an input/output apparatus. The terminal device 1000 may be applied to the communications system described above, and perform a function of the terminal device in the foregoing method embodiments.

The processor is mainly configured to process a communications protocol and communication data, control the entire terminal device, execute a software program, and process data of the software program, for example, configured to control the terminal device in performing the actions described in the foregoing method embodiments. The memory is mainly configured to store a software program and data. The control circuit is mainly configured to: perform conversion between a baseband signal and a radio frequency signal, and process the radio frequency signal. A combination of the control circuit and the antenna may also be referred to as a transceiver that is mainly configured to transmit and receive a radio frequency signal in a form of an electromagnetic wave. The input/output apparatus, such as a touchscreen, a display screen, and a keyboard, is mainly configured to receive data input by a user and output data to the user.

After the terminal device is powered on, the processor may read the software program in a storage unit, explain and execute an instruction of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 13 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit are integrated into the processor in FIG. 13. A person skilled in the art may understand that the baseband processor and the central processing unit may alternatively be independent processors, and are interconnected by using technologies such as a bus. A person skilled in the art may understand that the terminal device may include a plurality of baseband processors to adapt to different network standards, the terminal device may include a plurality of central processing units to improve a processing capability of the terminal device, and the components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, in the embodiment in FIG. 13, the antenna and the control circuit that have a transceiver function may be considered as a transceiver unit 1001 of the terminal device 1000, and the processor having a processing function may be considered as a processing unit 1002 of the terminal device 1000. As shown in FIG. 10, the terminal device 1000 includes the transceiver unit 1001 and the processing unit 1002. The transceiver unit may also be referred to as a transceiver, a transceiver machine, a transceiver apparatus, or the like. Optionally, a component that is in the transceiver unit 1001 and that is configured to implement a reception function may be considered as a receiving unit, and a component that is in the transceiver unit 1001 and that is configured to implement a sending function may be considered as a sending unit. In other words, the transceiver unit 1001 includes the receiving unit and the sending unit. For example, the receiving unit may also be referred to as a receiver machine, a receiver, a receive circuit, or the like, and the sending unit may be referred to as a transmitting machine, a transmitter, a transmitting circuit, or the like.

The terminal device 1000 shown in FIG. 13 can implement processes related to the terminal device in the method embodiments in FIG. 2 or FIG. 3. The operations and/or the functions of the modules in the terminal device 1000 are intended to implement corresponding procedures in the foregoing method embodiments. For details, refer to the descriptions in the foregoing method embodiments. To avoid repetition, detailed descriptions are properly omitted herein.

Figure 14:
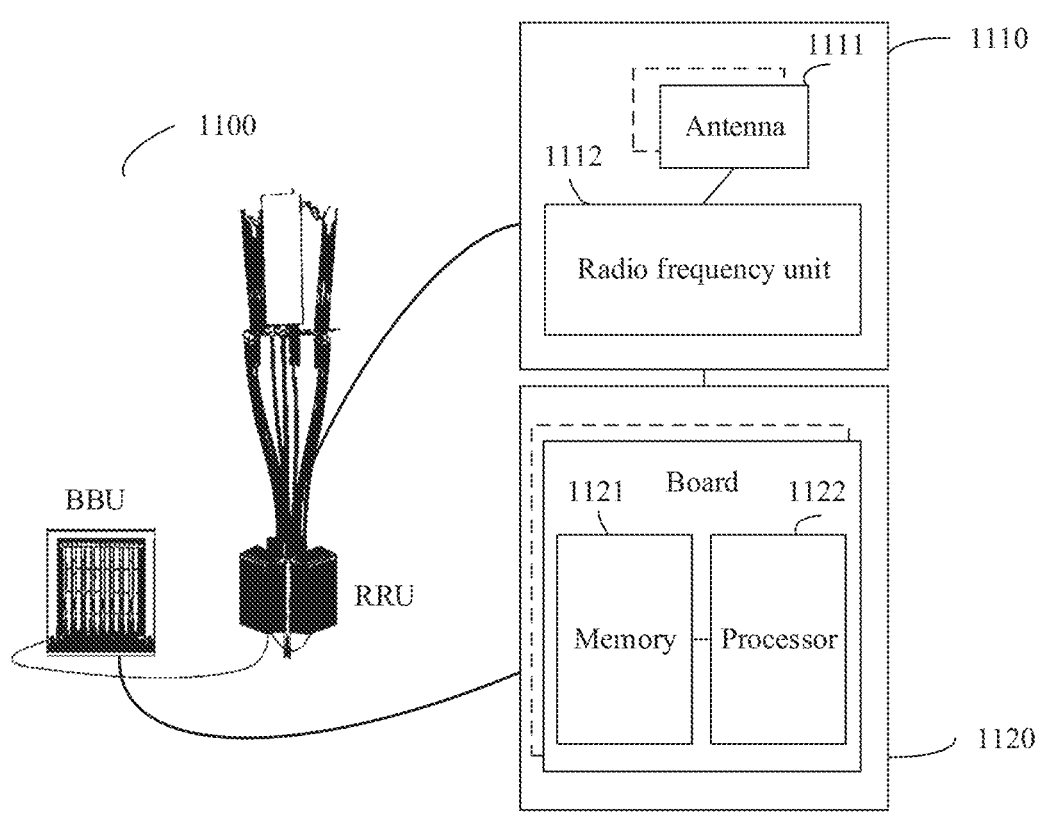
FIG. 14 is a schematic structural diagram of a network device according to an embodiment of this application.

FIG. 14 is a schematic structural diagram of a network device according to an embodiment of this application, for example, may be a schematic structural diagram of a network device. As shown in FIG. 14, the network device 1100 may be applied to the communications system shown above, and perform a function of the network device in the foregoing method embodiments.

The network device 1100 may include one or more radio frequency units, such as a remote radio unit (RRU) 1110 and one or more baseband units (BBU) (which may also be referred to as digital units (digital unit, DU)) 1120.

The RRU 1110 may be referred to as a transceiver unit, a transceiver machine, a transceiver circuit, a transceiver, or the like, and may include at least one antenna 1111 and a radio frequency unit 1112. The RRU 1110 part is mainly configured to perform receiving and sending of a radio frequency signal and conversion between a radio frequency signal and a baseband signal, for example, configured to send the indication information in the foregoing method embodiments. The RRU 1110 and the BBU 1120 may be physically disposed together, or may be physically separated, that is, in a distributed base station.

The BBU 1120 is a control center of the base station, may also be referred to as a processing unit, and is mainly configured to complete a baseband processing function such as channel coding, multiplexing, modulation, and spreading. For example, the BBU (the processing unit) 1120 may be configured to control the network device to perform an operation procedure related to the network device in the foregoing method embodiments.

In an embodiment, the BBU 1120 may include one or more boards. A plurality of boards may jointly support a radio access network (e.g., an NR network) of a single access standard, or may separately support radio access networks (e.g., an LTE network, a 5G network, and another network) of different access standards. The BBU 1120 further includes a memory 1121 and a processor 1122. The memory 1121 is configured to store a necessary instruction and necessary data. The processor 1122 is configured to control the network device (e.g., base station) to perform a necessary action, for example, is configured to control the network device to perform an operation procedure related to the network device in the foregoing method embodiments. The memory 1121 and the processor 1122 may serve one or more boards. In other words, a memory and a processor may be separately disposed on each board. Alternatively, a plurality of boards may share a same memory and a same processor. In addition, a necessary circuit may be further disposed on each board.

It should be understood that the network device 1100 shown in FIG. 14 can implement processes related to the network device in the method embodiments in FIG. 2 or FIG. 3. The operations and/or the functions of the modules in the network device 1100 are intended to implement corresponding procedures in the foregoing method embodiments. For details, refer to the descriptions in the foregoing method embodiments. To avoid repetition, detailed descriptions are properly omitted herein.

It should be understood that the processing apparatus may be a chip. For example, the processing apparatus may be a field-programmable gate array (FPGA), an application-specific integrated chip (ASIC), a system on chip (SoC), a central processor unit (CPU), a network processor (NP), a digital signal processing circuit (DSP), a micro controller (micro controller unit, MCU), a programmable controller (programmable logic device, PLD), or another integrated chip.

In an implementation process, the steps of the methods in the embodiments may be performed by using a hardware integrated logic circuit in the processor, or by using instructions in a form of software. The steps in the methods disclosed with reference to the embodiments of this application may be directly performed and completed through a hardware processor, or may be performed and completed through a combination of hardware in a processor and a software module.

It should be noted that the processor in the embodiments of this application may be an integrated circuit chip, and has a signal processing capability. In an implementation process, the steps in the foregoing method embodiments may be implemented by using a hardware integrated logic circuit in the processor or an instruction in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor in the embodiments of this application may implement or perform the methods, the steps, and the logical block diagrams that are disclosed in the embodiments of this application. The general-purpose processor may be a microprocessor, or the processor may be any conventional processor or the like.

It may be understood that the memory or the storage unit in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the methods described in this specification aims to include but is not limited to these memories and any memory of another proper type.

An embodiment of this application further provides a communications system. The communications system includes the foregoing terminal device and the foregoing network device.

An embodiment of this application further provides a computer-readable medium. The computer-readable medium stores a computer program, and when the computer program is executed by a computer, the method in any one of the foregoing embodiments is implemented.

An embodiment of this application further provides a computer program product. When the computer program product is executed by a computer, the method in any one of the foregoing embodiments is implemented.

An embodiment of this application further provides a system chip. The system chip includes a communications unit and a processing unit. The processing unit may be, for example, a processor. The communications unit may be, for example, an input/output interface, a pin, a circuit, or the like. The processing unit may execute a computer instruction, so that a chip in the communications apparatus performs any method provided in the foregoing embodiments of this application.

Optionally, the computer instruction is stored in a storage unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded or executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server and a data center, integrating one or more usable media. The usable medium may be a magnetic medium (e.g., a floppy disk, a hard disk, or a magnetic tape), an optical medium (e.g., a high-density digital video disc (DVD)), a semiconductor medium (e.g., a solid-state drive (solid state disk, SSD)), or the like.

In this application, "at least one" means one or more, and "a plurality of" means two or more. The term "and/or"

describes an association relationship for describing associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" that appears throughout the entire specification does not necessarily mean a same embodiment. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

What is claimed is:

1. A random access method carried out by a terminal device, the method comprising:
   receiving a first control channel resource set used to monitor a common physical downlink control channel (PDCCH) and a second control channel resource set used to monitor a specific PDCCH that are sent by a network device, wherein the first control channel resource set corresponds to a first search space, and wherein the second control channel resource set corresponds to a second search space;
   sending, to the network device, a first message comprising:
   a random access preamble, and
   a physical uplink shared channel (PUSCH);
   monitoring the first search space to receive the common PDCCH that is used to schedule a physical downlink shared channel (PDSCH) carrying a response to the random access preamble of the first message; and
   monitoring the second search space to receive the specific PDCCH that is used to schedule a PDSCH carrying a response to the PUSCH of the first message.

2. The method according to claim 1, wherein the first search space and the second search space are different.

3. The method according to claim 1, wherein the monitoring the first search space and the second search space to receive the at least one PDCCH sent by the network device comprises:
   monitoring the first search space to receive the common PDCCH, wherein the common PDCCH is used to schedule the response to the random access preamble; or
   monitoring the second search space based on the response to the random access preamble to receive the specific PDCCH, wherein the specific PDCCH is used to schedule the PDSCH carrying the response to the PUSCH.

4. The method according to claim 1, wherein the monitoring the second search space to receive the specific PDCCH comprises:
   monitoring the second search space based on a specific radio network temporary identifier (S-RNTI) to receive the specific PDCCH,
   wherein the S-RNTI is determined based on a resource unit used when the first message is sent, or the S-RNTI is a cell radio network temporary identifier (C-RNTI), or the S-RNTI is determined based on a contention resolution identifier in the first message; and
   wherein the resource unit used when the first message is sent comprises at least one resource unit of a type taken from the group consisting of:
   an index of the random access preamble,
   a time-frequency resource block of the PUSCH, and
   an antenna port corresponding to the PUSCH.

5. The method according to claim 3, wherein the monitoring the second search space based on the response to the random access preamble to receive the specific PDCCH comprises:
   monitoring the second search space based on a temporary cell radio network temporary identifier (TC-RNTI) carried in the response to the random access preamble to receive the specific PDCCH.

6. The method according to claim 1, wherein the monitoring the first search space to receive the common PDCCH comprises:
   monitoring the first search space based on a group radio network temporary identifier (G-RNTI) to receive the common PDCCH,
   wherein the G-RNTI is determined based on a resource block in which the resource unit used when the first message is sent is located, and
   wherein the resource block comprises a time-frequency resource block used to send the random access preamble.

7. The method according to claim 1, further comprising:
   obtaining first configuration information, wherein the first configuration information comprises:
   a window length of a first time window, and
   a window length of a second time window,
   wherein the window length of the first time window is a length of a time window used to receive the response message of the first message,
   wherein the window length of the second time window is a length of a time window used to receive a response message of a second message, and
   wherein the second message comprises only the random access preamble.

8. A communications apparatus, comprising:
   a processor; and
   a non-transitory computer-readable medium including computer-executable instructions that, when executed by the processor, cause the communications apparatus to carry out a method comprising:
   receiving a first control channel resource set used to monitor a common physical downlink control channel (PDCCH) and a second control channel resource set used to monitor a specific PDCCH that are sent by a network device, wherein the first control channel resource set corresponds to a first search space, and wherein the second control channel resource set corresponds to a second search space;
   sending, to the network device, a first message comprising:
   a random access preamble, and
   a physical uplink shared channel (PUSCH);
   monitoring the first search space to receive the common PDCCH that is used to schedule a physical downlink shared channel (PDSCH) carrying a response to the random access preamble of the first message; and monitoring the second search space to receive the specific PDCCH that is used to schedule a PDSCH carrying a response to the PUSCH of the first message.

9. The communications apparatus according to claim 8, wherein the first search space and the second search space are different.

10. The communications apparatus according to claim 8, wherein the monitoring the first search space and the second search space to receive the at least one PDCCH sent by the network device comprises: monitoring the first search space to receive the common PDCCH, wherein the common PDCCH is used to schedule the response to the random access preamble; or monitoring the second search space based on the response to the random access preamble to receive the specific PDCCH, wherein the specific PDCCH is used to schedule the PDSCH carrying the response to the PUSCH.

11. The communications apparatus according to claim 8, wherein the monitoring the second search space to receive the specific PDCCH comprises:

monitoring the second search space based on a specific radio network temporary identifier S-RNTI to receive the specific PDCCH, wherein the S-RNTI is determined based on a resource unit used when the first message is sent, or the S-RNTI is a cell radio network temporary identifier (C-RNTI), or the S-RNTI is determined based on a contention resolution identifier in the first message, and wherein the resource unit used when the first message is sent comprises at least one resource unit of a type taken from the group consisting of:

an index of the random access preamble, a time-frequency resource block of the PUSCH, and an antenna port corresponding to the PUSCH.

12. The communications apparatus according to claim 10, wherein the monitoring the second search space based on the response to the random access preamble to receive the specific PDCCH comprises:

monitoring the second search space based on a temporary cell radio network temporary identifier (TC-RNTI) carried in the response to the random access preamble to receive the specific PDCCH.

13. The communications apparatus according to claim 8, wherein the monitoring the first search space to receive the common PDCCH comprises:

monitoring the first search space based on a group radio network temporary identifier G-RNTI to receive the common PDCCH, wherein the G-RNTI is determined based on a resource block in which the resource unit used when the first message is sent is located, and wherein the resource block comprises a time-frequency resource block used to send the random access preamble.

14. The communications apparatus according to claim 8, wherein the method further comprises:

obtaining first configuration information, wherein the first configuration information comprises:

a window length of a first time window, and a window length of a second time window, wherein the window length of the first time window is a length of a time window used to receive the response message of the first message, wherein the window length of the second time window is a length of a time window used to receive a response message of a second message, and wherein the second message comprises only the random access preamble.

15. A communications apparatus, comprising:

a processor; and a non-transitory computer-readable medium including computer-executable instructions that, when executed by the processor, cause the communications apparatus to carry out a method comprising:

sending, to a terminal device, a first control channel resource set used to monitor a common physical downlink control channel (PDCCH) and a second control channel resource set used to monitor a specific PDCCH, wherein the first control channel resource set corresponds to a first search space, and the second control channel resource set corresponds to a second search space;

receiving a first message, which is sent by the terminal device, that comprises:

a random access preamble, and a physical uplink shared channel (PUSCH); and sending, to the terminal device, the common PDCCH that is used to schedule a physical downlink shared channel (PDSCH) carrying a response to the random access preamble of the first message; and sending, to the terminal device, the specific PDCCH that is used to schedule a PDSCH carrying a response to the PUSCH of the first message.

16. The communications apparatus according to claim 15, wherein the first search space and the second search space are different.

17. The communications apparatus according to claim 15, wherein the specific PDCCH is scrambled based on a specific radio network temporary identifier S-RNTI, and the S-RNTI is determined based on a resource unit used when the first message is sent, or the S-RNTI is a cell radio network temporary identifier C-RNTI, or the S-RNTI is determined based on a contention resolution identifier in the first message, wherein the resource unit used when the first message is sent comprises at least one of an index of the random access preamble, a time-frequency resource block of the PUSCH, and an antenna port corresponding to the PUSCH.

18. The communications apparatus according to claim 15, wherein the common PDCCH is scrambled based on a group radio network temporary identifier G-RNTI, the G-RNTI is determined based on a resource block in which the resource unit used when the first message is received is located, and the resource block comprises a time-frequency resource block used to send the random access preamble.

19. A non-transitory computer storage medium, wherein the computer storage medium stores program code including computer-executable instructions that, when executed by a processor, facilitate carrying out a method comprising:

receiving a first control channel resource set used to monitor a common physical downlink control channel (PDCCH) and a second control channel resource set used to monitor a specific PDCCH that are sent by a network device, wherein the first control channel resource set corresponds to a first search space, and wherein the second control channel resource set corresponds to a second search space;

sending, to the network device, a first message comprising:

a random access preamble, and
a physical uplink shared channel (PUSCH); and
monitoring the first search space to receive the common PDCCH that is used to schedule a physical downlink shared channel (PDSCH) carrying a response to the random access preamble of the first message; and
monitoring the second search space to receive the specific PDCCH that is used to schedule a PDSCH carrying a response to the PUSCH of the first message.

\* \* \* \* \*